United States Patent
Clemm et al.

(10) Patent No.: US 7,466,710 B1
(45) Date of Patent: Dec. 16, 2008

(54) MANAGING PACKET VOICE NETWORKS USING A VIRTUAL ENTITY APPROACH

(75) Inventors: L. Alexander Clemm, Cupertino, CA (US); Poon K. Leung, Saratoga, CA (US); Zbigniew Blaszczyk, San Jose, CA (US); Sudhir Thombare, Sunnyvale, CA (US); Eshwar Yedavalli, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 1157 days.

(21) Appl. No.: 10/147,014

(22) Filed: May 15, 2002

Related U.S. Application Data

(63) Continuation-in-part of application No. 10/027,005, filed on Dec. 19, 2001, now Pat. No. 7,126,941.

(60) Provisional application No. 60/314,745, filed on Aug. 24, 2001.

(51) Int. Cl.
*H04L 12/56* (2006.01)
*G06F 15/173* (2006.01)

(52) U.S. Cl. ............... 370/401; 370/410; 709/223

(58) Field of Classification Search ............ None
See application file for complete search history.

(56) References Cited

U.S. PATENT DOCUMENTS

| | | | |
|---|---|---|---|
| 6,373,857 B1 | 4/2002 | Ma | |
| 6,519,249 B1 | 2/2003 | Bennefeld et al. | |
| 6,614,781 B1 | 9/2003 | Elliott et al. | |
| 6,650,342 B1 * | 11/2003 | Lim | 715/736 |
| 6,654,366 B1 * | 11/2003 | Ketcham | 370/352 |
| 6,701,358 B1 | 3/2004 | Poisson et al. | |
| 6,925,076 B1 * | 8/2005 | Dalgic et al. | 370/356 |
| 7,000,014 B2 | 2/2006 | Poisson et al. | |
| 2001/0003189 A1 | 6/2001 | Miyazawa et al. | |

(Continued)

OTHER PUBLICATIONS

Packetizer, Inc., "H.323, H.323 Information Site," http://www.packetizer.com/iptel/h323/, printed Sep. 11, 2002, pp. 1-3.

(Continued)

*Primary Examiner*—Firmin Backer
*Assistant Examiner*—Clemence Han
(74) *Attorney, Agent, or Firm*—Hickman Palermo Truong & Becker LLP

(57) ABSTRACT

A method for managing packet voice networks conforming to ITU Recommendation H.323, using a virtual entity approach and abstract information model approach, is disclosed. A virtual zone object represents an association of a virtual gateway, which comprises an H.323 gateway and a signaling controller, and one or more associated virtual gatekeepers, each of which comprises an H.323 gatekeeper, or the combination of an H.323 gatekeeper and a route server. User input specifies a configuration operation on the virtual zone and one or more parameter values. One or more configuration instructions are automatically issued to both the gateway and the gatekeeper, and other involved objects representing other involved network elements, resulting in configuring both the gateway and the gatekeeper as specified in the user input. As a result, a user can configure or operate on a virtual zone or other virtual object as an atomic entity, for example, in a network management application, without involvement in complicated details of the actual network devices that provide a particular packet voice service.

30 Claims, 22 Drawing Sheets

U.S. PATENT DOCUMENTS

| | | |
|---|---|---|
| 2002/0075844 A1* | 6/2002 | Hagen ........................ 370/351 |
| 2003/0030662 A1 | 2/2003 | Poisson et al. |
| 2003/0031165 A1 | 2/2003 | O'Brien |
| 2003/0035417 A1 | 2/2003 | Zirojevic et al. |
| 2003/0046400 A1 | 3/2003 | Friel et al. |
| 2003/0137532 A1* | 7/2003 | Proulx et al. ................ 345/735 |
| 2004/0001084 A1* | 1/2004 | Shrinidhi et al. ............ 345/734 |
| 2004/0022237 A1 | 2/2004 | Elliot et al. |
| 2004/0047345 A1 | 3/2004 | Joseph et al. |
| 2004/0139209 A1 | 7/2004 | Mussman et al. |
| 2004/0199624 A1 | 10/2004 | Poisson et al. |
| 2005/0022183 A1 | 1/2005 | Poisson et al. |

OTHER PUBLICATIONS

Packetizer, Inc., "H.323, A Primer on the H.323 Series Standard," http://www.packetizer.com/iptel/h323/papers/primer/, printed Sep. 11, 2002, pp. 1-18.

Cisco Systems, "Introduction to Packet Voice Networking in the Wide Area Network," 2001, pp. 1-12.

Paul E. Jones, "Series H.: Audiovisual and Multimedia Systems, Infrastructure of audiovisual services—Systems and terminal equipment for audiovisual services," ITU-T, Telecommunication Standardization Sector of ITU, H.323, Draft v4, Nov. 2000, 234 pages.

* cited by examiner

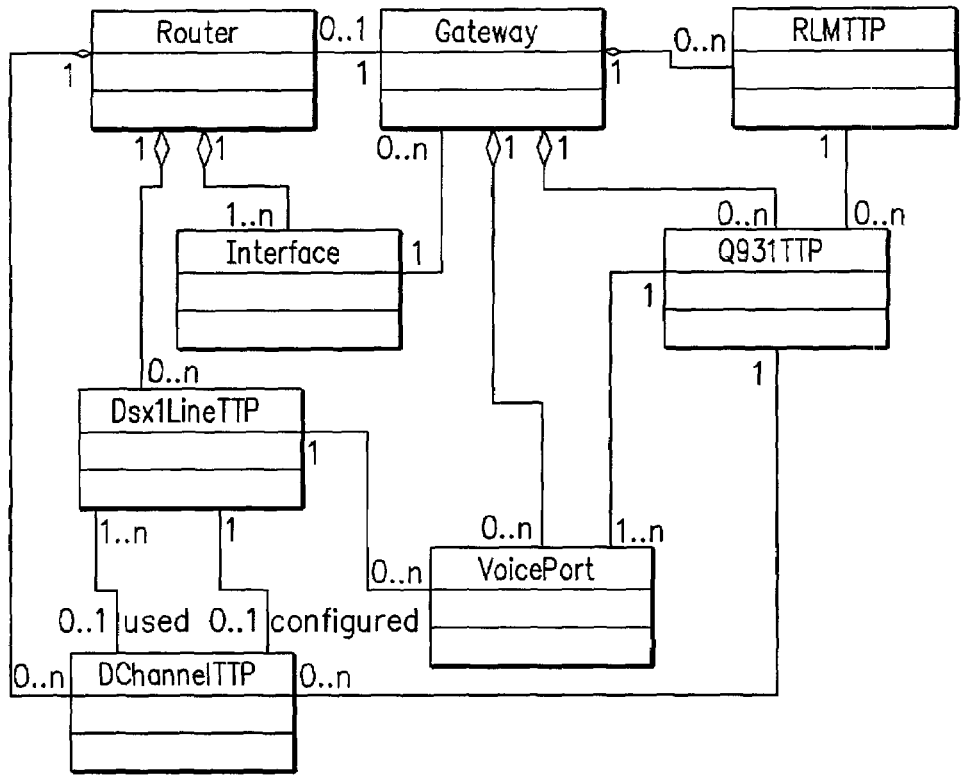
*FIG. 13A*
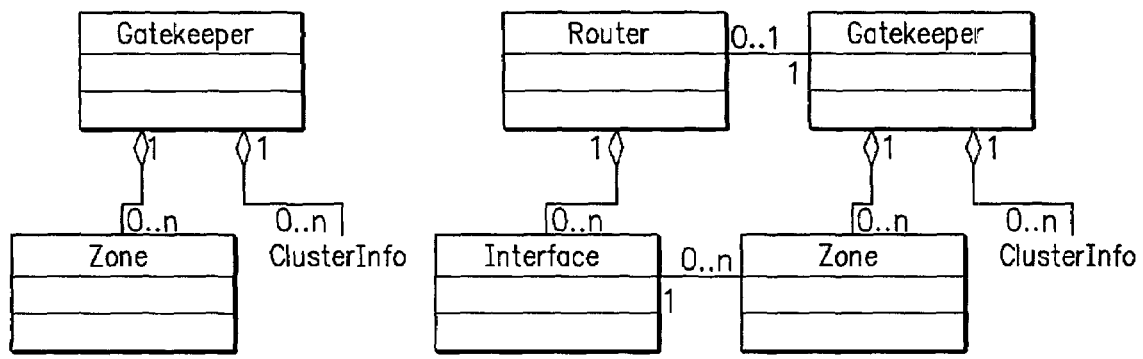
*FIG. 13B*   *FIG. 13C*

MANAGING PACKET VOICE NETWORKS USING A VIRTUAL ENTITY APPROACH

CROSS-REFERENCE TO RELATED APPLICATIONS; PRIORITY CLAIM

This application claims benefit of domestic priority as a Continuation-in-part of prior application Ser. No. 10/027,005, filed Dec. 19, 2001 now U.S. Pat. No. 7,126,941, and from Provisional Appln. 60/314,745, filed Aug. 24, 2001, the entire contents of which are hereby incorporated by reference as if fully set forth herein, under 35 U.S.C. §119(e) and §120.

FIELD OF THE INVENTION

The present invention relates to managing packet-switched telecommunication networks that carry voice and telephone call information, and relates more specifically to managing H.323 networks using a virtual entity approach.

BACKGROUND OF THE INVENTION

Telecommunications service providers and equipment manufacturers are now rapidly developing and deploying packet-switched data communication networks that can carry voice and telephone call information, and that conform to published, non-proprietary engineering standards and protocols. Such "open packet telephony" ("OPT") networks allow for integrating multiple services, such as voice and data, on the same network, which results in a cost savings.

One class of OPT networks is based on ITU recommendation H.323. Other OPT networks may be based on Media Gateway Control Protocol (MGCP) and its derivatives, such as SGCP, MeGaCo, H.248, and Session Initiation Protocol (SIP). In OPT networks based on the H.323 family of protocols, more intelligence is placed in the network as opposed to controllers. In contrast, OPT networks based on MGCP and similar protocols are designed such that individual networking devices store and process limited information about the network and its protocols ("intelligence") and hence place most of the intelligence that is required for voice services in gateway controllers.

Generally, in an OPT network, voice functionality is separated into different planes. A bearer plane and a switching plane communicate data packets between endpoints. Media Gateway ("MG") devices are located at the edge of the packet network and interface the packet network to other networks, such as the public switched telephony network. MGs provide facilities to transmit and receive data over the packet network, and convert data between the Time Division Multiplexed (TDM) format that is used in telephony networks, and the packetized voice payload format that is used in OPT networks. The signaling and control plane provides call intelligence, processing signaling, routing calls, interpreting dial plans, etc.

The signaling and control plane comprises one or more Media Gateway Controller (MGC) devices. MGCs instruct MGs through a control protocol such as MGCP to create, delete and modify voice connections. MGCs also terminate the signaling required for voice. In cases where signaling is physically connected to a Media Gateway, as with Primary Rate Interface or PRI, the signaling is backhauled between the MG and MGC. In this context, a "backhauled" signal is one that is transported from a MG to a MGC, because the MGC is the entity that possesses or controls the MG.

Although OPT networks provide cost savings, managing OPT networks is far more complex than managing the TDM switches that are found in conventional circuit-switched networks, which the OPT networks are replacing. With TDM switches, operators manage and interact with fewer devices, possibly even one device, although each device is complex. In contrast, operators of OPT networks are required to manage and interact with a significant number of devices and many different types of devices. In short, where operators previously had to manage one network element, operators now have to manage an entire network.

For example, configuration and provisioning of the devices in an OPT network must be coordinated. Configuration mismatches must be properly detected. Alarms between different devices must be correlated where different devices detect the same error condition and, therefore, generate redundant alarms. As a further complication, the common principles underlying the operation of the OPT network are often not well understood by operators, who tend to "think" in terms of boxes rather than in terms of general architecture. This increases costs and reduces profitability of service providers, as general operational complexity is increasing.

Further, how network management applications handle a problem is largely determined by how the application domain is modeled through data structures, program functions, and related processes. There is a need for modeling OPT networks in a way that simplifies dealing with such networks while addressing the unique properties of an OPT network. Current protocols and standards fail to address this need. In current approaches, network elements that represent MGs and MGCs are simply modeled and managed like any other network elements.

Distribution of functionality is one problem. Whereas TDM networks traditionally comprise monolithic network elements that hide much of their internal complexity, some of this complexity is now exposed, as functionality is distributed over several independent and cooperating components. Each component on its own is significantly simpler than a TDM switch, but the overall complexity of the network is higher, and it has a greater number and variety of components. Consistent provisioning of control elements as well as provided services can be a challenge because there is often a need to correctly configure multiple network elements.

Openness also results in management difficulty. Different components now provide functions that formerly were provided by the same TDM switch, and the different components may come from different vendors and may comprise different equipment types. There is a need for a way to accommodate future releases and implementations of MGs in a network management solution.

Flexibility also causes management challenges. Networks can have vastly different architectures. Central office equipment and customer premises equipment with different characteristics all may participate as MGs in the same virtual switch. The relationship between MGs and MGCs may vary over time.

Integration causes still other problems. A bearer network may carry services other than voice, which require management. A component acting as MG in a voice network may at the same time be part of a traditional data network. This introduces overlaps and dependencies between management domains, introducing additional complexity.

H.323 networks share similar problems. Indeed, in H.323 networks, the management problems outlined above can be considered even more acute because intelligence is less centralized than in an MGCP network. Based on the foregoing, there is a clear need in this field for improved methods to manage OPT networks and devices in them.

There is a particular need for an integrated network management solution for OPT networks that use ITU Recommendation H.323, so that gatekeepers and gateways are managed in a coordinated way.

There is also a need for a way for a solution that is operable in a way that is intuitive for an administrator or operator.

SUMMARY OF THE INVENTION

The foregoing needs, and other needs and objects that will become apparent for the following description, are achieved in the present invention, which comprises, in one aspect, a method for managing packet voice networks conforming to ITU Recommendation H.323, using a virtual entity approach and abstract information model approach, is disclosed. A virtual zone object represents an association of an H.323 gateway and one or more associated H.323 gatekeepers. User input specifies a configuration operation on the virtual zone and one or more parameter values. One or more configuration instructions are automatically issued to both the gateway and the gatekeeper, and other involved objects representing other involved network elements, resulting in configuring both the gateway and the gatekeeper as specified in the user input. As a result, a user can configure or operate on a virtual zone or other virtual object as an atomic entity, for example, in a network management application, without involvement in complicated details of the actual network devices that provide a particular packet voice service.

In other embodiments, virtual entities such as virtual SS7 gateways, virtual zone connections, virtual gateways, and others are used. There can be more than one H.323 gateway in a virtual zone. Further, an H.323 gateway may have an associated signaling controller, which is also considered as part of the same virtual zone.

In particular, in one embodiment, techniques are provided for managing packet switched networks that carry voice and more specifically for managing such networks using a virtual zone information object and processes that use and that implement such objects. The virtual zone represents a plurality packet switched network elements, such as gatekeepers and gateways. A virtual zone can be manipulated in a way that is analogous to provisioning a TDM switch and its constituent elements. In response to modification of a virtual zone object, programmatic processes automatically issue configuration commands or take other required actions with respect to all actual physical and logical devices and interfaces that are represented by the virtual zone object. As a result, the work required by operators and the number of errors interjected by operators is reduced.

Virtual zone operations are provided for operating on the virtual zone objects for performing provisioning and other functions are provided. The virtual zone object, in conjunction with the virtual zone operations, encapsulates and abstracts the packet switched network elements and facilitates provisioning the packet switched network elements. Thus much of the underlying complexity of a packet switched network is hidden from users, which simplifies network management.

Discrepancy detection and validation are also supported. In one embodiment, processes are provided to validate that the components of a virtual entity are configured in a way consistent with network level configuration integrity rules. Such validation can occur, for example, when the management system synchronizes its information with the network.

In other aspects, the invention encompasses a computer apparatus, a computer readable medium, and a carrier wave configured to carry out the foregoing steps.

In one embodiment, a virtual switch useful with an OPT network based on the MGCP protocol, and related control processes, are described. In another embodiment, networks based on H.323 use analogous concepts. In one such embodiment, virtual zones that encapsulate gateway and gatekeeper combinations are provided, and virtual SS7 gateways that encapsulate combinations of gateways and signaling controllers are provided. Other embodiments that provide route servers with gatekeepers are contemplated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13A is a block diagram of a router association view of a gateway;

FIG. 13B is a block diagram of a connection termination point view of a gatekeeper;

FIG. 13C is a block diagram of a router association view of a gatekeeper; and

DETAILED DESCRIPTION OF THE PREFERRED EMBODIMENT

Figure 1A:
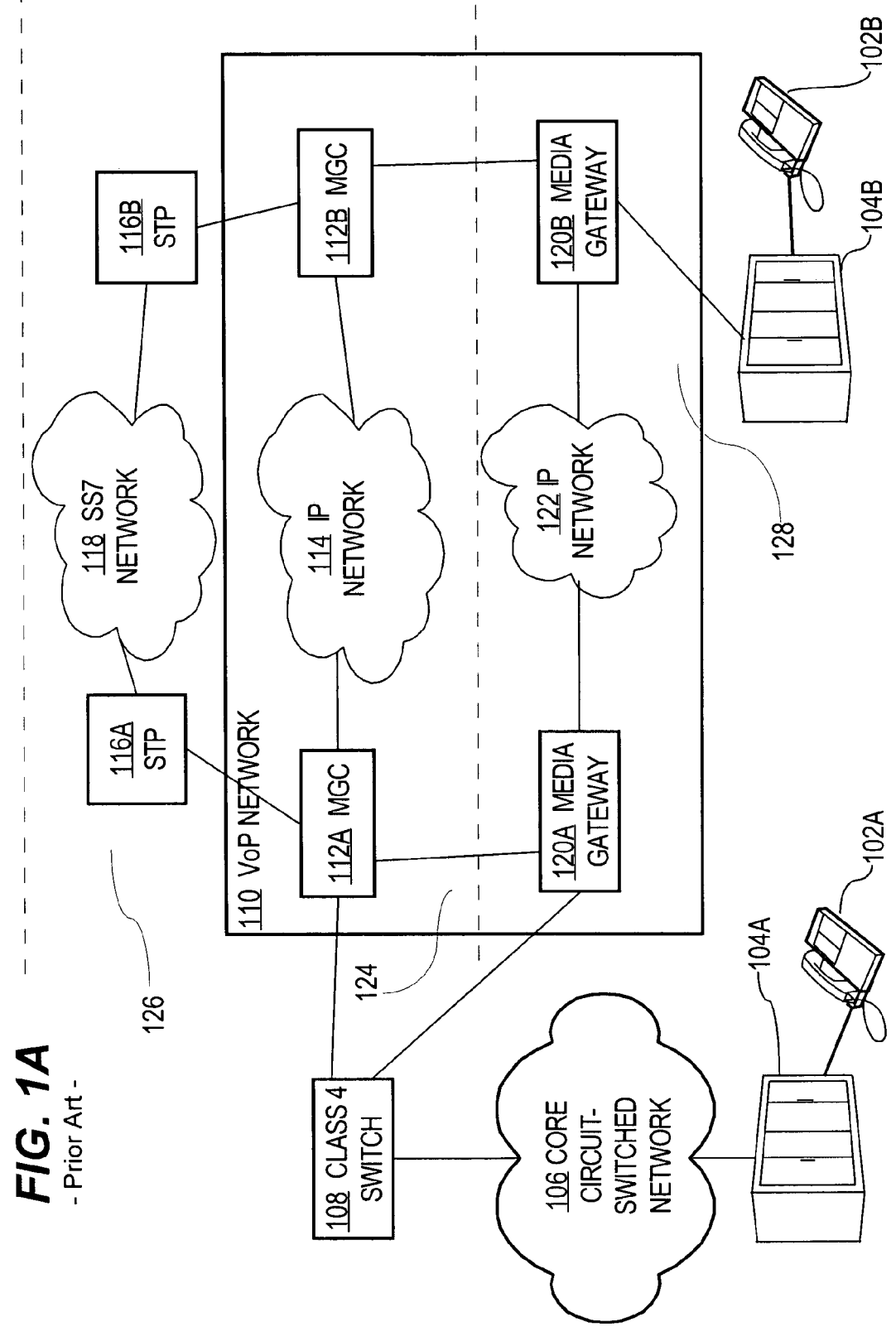
FIG. 1A is a block diagram of an example of an MGCP-based open packet telephony network.

A method for managing packet voice networks using a virtual switch approach and abstract information model approach is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For purposes of illustrating clear examples, the description herein generally relates to networks that are based on the H.323 protocol. However, embodiments are not limited to such a context, and embodiments are applicable to networks that use other OPT protocols. For example, embodiments described herein include a virtual zone and other virtual entities useful with H.323 OPT networks; other embodiments include a virtual switch useful with an OPT network based on the MGCP protocol. However, networks based on other protocols may use analogous concepts. In one such embodiment, virtual zones that encapsulate gateway and gatekeeper combinations are provided, and virtual SS7 gateways that encapsulate combinations of gateways and signaling controllers are provided. Other embodiments that provide route servers with gatekeepers are contemplated.

TERMINOLOGY

In this description, the following terms have the following meanings.

Directory Gatekeeper—a Directory Gatekeeper (DGK) is a Gatekeeper that is configured to accept location request (LRQ) forwarding. With a Directory Gatekeeper, individual Gatekeepers do not need to know about other Gatekeepers. Instead, a Gatekeeper consults its routing table, which provides a default route to a Directory Gatekeeper. This Directory Gatekeeper is more knowledgeable about the topology of the network and can forward messages over to the proper egress Gatekeeper. The egress Gatekeeper can then contact the originating Gatekeeper to complete the call setup.

DGK Group—group of Directory Gatekeepers, in which the Gatekeepers are configured solely for the purpose of redundancy through hot standby router protocol (HSRP), and/or serving as alternate DGKs.

Gatekeeper—an H.323 Gatekeeper (GK) provides E.164 address resolution and controls access for all types of H.323 endpoints. It can provide other services to the endpoints such as bandwidth shaping and gateway location. The Gatekeeper maintains a registry of H.323 endpoints in a H.323 network. The endpoints register with Gatekeeper at start-up, and they request admission from the Gatekeeper to set up a call. Similar to GW, a GK is a role that a physical device plays in the voice network. In the global long distance voice context, in one embodiment, a Cisco 3600 series router may be used as the Gatekeeper.

GK Group—a Gatekeeper Group is an address resolution authority in a Virtual Zone. The GK Group must contain a primary Gatekeeper, and may contain a HSRP GK and/or one or more alternate GKs. GK Groups are typically established to enable load balancing among multiple gatekeepers.

H.323 Gateway (or "Gateway")—an H.323 Gateway (or "Gateway") is a type of Network Access Server (NAS) that acts as an interface between a circuit-switched PSTN network and a packetized voice network. A Gateway is the point at which a circuit-switched fax or voice call is encoded (using a CODEC) and repackaged into IP packets (or vice versa).

In a global long distance voice application, the Cisco 3640, 3660, AS5300, AS5350, AS5400, AS5800, or AS5850, or other functionally equivalent devices, may function as a Media Gateway. In this context, a Gateway initiates a call set-up with a H.323 Gatekeeper through H.225 RAS. The originating Gateway terminates the VoIP call to an appropriate destination Gateway with the Gatekeepers assistance. The terminating Gateway then re-translates the packetized voice into a format acceptable to the adjacent PSTN network. Thus, Media Gateway is a role that a physical device plays in the voice network; the same device can be configured for another role (such as MGCP gateway) in another setting.

Signaling Controller—a Signaling Controller is a network element that terminates signaling and performs signaling conversion. In the global long distance voice context, in one embodiment, a Cisco Signaling Controller (SC) complex is used as a Signaling Controller. In this context, the SC provides an SS7 (ISUP or TCAP) to Q.931-over-IP signaling conversion function. The SC terminates the Message Transfer Part (MTP) Layer 3, converts the messages to Q.931 protocol and sends them to the gateway over an IP-based NFAS D Channel. The SC provides SS7 connectivity to the PSTN for the H.323 gateways. The SC does not provide any call routing functionality in the packet network. The call processing and routing functions are handled by the Gateways and Gatekeepers.

In one embodiment, the SC complex comprises a distributed combination of multiple components. In one specific embodiment, the SC complex comprises a Cisco SC2200, 5500, and SLT 2600. However, the SC complex may be viewed as one logical network element.

H.323 Gateway-SC association—refers to the control ownership relationship between SC and H.323 Gateway. This relationship is reflected through a set of control connections between an H.323 Gateway and SC. This includes xGCP connections, signaling backhaul, as well as any resource coordination connections. In the global long distance voice context, this includes one control association: Q.931 backhaul for D-channel over Redundant Link Manager over RUDP.

Region—a Region is a logical container that partitions the H.323 voice network. It may contain zero or one DGK Group, and one or more H.323 zones.

Router—a router is a network device that performs packet routing functions. Depending on the service modules installed and the software settings, the same physical router can play different roles, including acting as a layer 3 IP router, a voice gateway, a gatekeeper, a SLT, or a voice gateway with embedded SLT. In the future, a router can even be configured to act as a gateway and gatekeeper at the same time.

Signaling port—a port provided by a virtual gateway that terminates signaling; also termed D-channel port.

Trunk—a port provided by a virtual gateway that terminates a voice channel. Typically, a DS0.

Virtual Gatekeeper—a logical container for a gatekeeper and a route server. One function performed by a virtual gatekeeper in the signaling and control plane concerns route selection, for example, resolution of E.164 addresses to network addresses. A gateway communicates with a gatekeeper to perform route selection. In one approach, a gatekeeper communicates with a route server to perform route selection. Because the route server serves as an extension of the gatekeeper's own route selection function, use of a virtual gatekeeper to represent a combination of gatekeeper and route server is beneficial and shields users from having to set up and coordinate the connectivity between gatekeeper and route server.

Virtual SS7 Gateway—a Virtual SS7 Gateway is a logical container consisting of one Media Gateway, and one Signaling Controller, and their interconnections. The MGC functions as a SS7 signaling gateway to the MG. In the global long distance voice context, a Virtual SS7 Gateway consists of one Voice Gateway and signaling converter, such as the Cisco SC2200 Signaling Converter. An SS7 network is communicatively coupled to the signaling converter, and the signaling converter is communicatively coupled to the Voice Gateway. The signaling controller converts RUDP based MTP3 messages from the SS7 network to Q.931 format messages, which are then sent to the Voice Gateway. Use of a Virtual SS7 Gateway is appropriate only in embodiments that interface to an SS7 PSTN network.

Virtual Gateway—a Virtual Gateway is either a Gateway, or a Virtual SS7 Gateway.

Virtual Voice Port—a logical container for a virtual aggregation of signaling and a voice port.

Virtual Zone—a Virtual Zone is a group of Virtual Gateways and their associated GKs that are in the same GK Group, according to the same criteria as would be found for a canonical H.323 zone. A canonical H.323 zone consists of a set of GW groups with the same prefix; all GWs in the same zone route calls through the same address resolution authority (essentially a GK Group or OSP Server). Thus, each zone contains a list of address resolution authorities that could be used as destinations for egress routes. The address resolution authority could be a GK Group, or OSP Server. In addition, a Virtual Zone also includes the GK Group and the adjoining SS7 signaling controllers. There can be only one GK group in a zone.

Voice Port—Voice ports are found at the intersection of packet-based networks and traditional telephony networks. A voice port is essentially a collection of Ds0 that physically connect an access server to a line from a circuit-switch telephony device in a PBX or PSTN. The voice port must be configured to convey signaling information in a way that the circuit-switched network can understand. Voice ports are essentially TDM ports.

Technical Overview

Open packet telephony (OPT) networks based on Voice over Packet (VoP) technology are making inroads into the infrastructure of voice carriers. OPT networks enable service providers to offer telephony integrated with other services in a cost-effective way. Although several different OPT architectures exist, some have shared characteristics. For example, in general, OPT networks provide a bearer plane that deals with transport of voice payload data, and a separate control plane is responsible for signaling and provides "intelligence" in the network. Separation of the bearer plane and control plane enables other services to share the bearer plane, which services are controlled through their own control planes. Thus, multiple services can use the same transport mechanism with separate control mechanisms.

Separation of bearer and control planes also allows for flexibility in the design of OPT networks and enables integrated services to be provided by different components of different vendors. Because functions can be distributed across such components, the components tend to have less complexity individually and wider applicability, providing cost advantages. Further, service providers can differentiate themselves by creating networks in different ways to address different services and service characteristics.

However, network management is less well-developed in the context of OPT networks. Distribution of functionality across separate and heterogeneous components of multiple vendors increases the management complexity of the resulting networks. Further, whereas TDM switches in conventional networks had closed and proprietary interfaces not available for management manipulation, OPT network elements have open interfaces that are often exposed to management. As a result, there is an increasing need for management solutions, and the management problem is also more complex.

Effective management solutions are possible only with a thorough understanding of the unique aspects of OPT networks and how they impact management. However, service providers generally expect management solutions for OPT networks to fit in seamlessly with existing operations support structures and systems. Therefore, there is a need for a way to hide much of the underlying complexity of OPT networks from the operator.

FIG. 1A is a block diagram of an example of an open packet telephony network that is based on MGCP/H.248. First and second telephones 102A, 102B are communicatively coupled to respective private branch exchange (PBX) devices 104A, 104B. A first PBX 104A is communicatively coupled to a core circuit-switched network 106, which internally comprises one or more conventional TDM telephony switches in, for example, the public switched telephone network (PSTN) of an incumbent local exchange carrier (ILEC). At an edge point of the PSTN, such as at a telephone company office (CO), resides a class 4 switch 108 that is communicatively coupled to the network 106 and to a first media gateway controller 112A in a voice over packet network 110. The MGC 112A is communicatively coupled to an Internet Protocol (IP) network 114 that is coupled to a second MGC 112B at another point. Collectively MGC 112A, 112B and IP network 114 form a signaling and control plane 124 of the VoP network 110.

A signaling and control plane 126 that lies logically outside the VoP network comprises first and second signaling transfer points (STPs) 116A, 116B, which are communicatively coupled to an SS7 switching network 118. These elements cooperate to provide signaling and control functions in the VoP network 110. For example, MGC 112A can backhaul certain signaling and control signals that cannot traverse IP network 114 through STP 116A, SS7 network 118, and STP 116B to reach MGC 112B.

A bearer plane 128 of VoP network 110 comprises first and second media gateways (MGs) 120A, 120B that are communicatively coupled to a second IP network 122. Alternatively, network 122 may be an ATM network that comprises one or more ATM switches. Networks 114, 122 may overlap or constitute the same network. A first MG 120A is communicatively coupled to class 4 switch 108 and to a corresponding first MGC 112A that controls it. The second MG 120B is coupled to a corresponding MGC 112B that controls it. The second MGC 120B is further coupled to the second PBX 104B.

In one embodiment, each MG may comprise one or more Cisco MGX 8260 devices from Cisco Systems, Inc., San Jose, Calif., which may be coupled by DS3 connections to the PSTN of the ILEC. One such device, or a redundant pair, is typically used. Each MG may also have a DS3 connection to a PSTN of a competitive local exchange carrier (CLEC) and a DS3 or primary rate interface (PRI) connection to a service provider network. Each MGC may comprise the combination of redundant Sun Microsystems Netra servers, Cisco VSC3000 Virtual Switch Controller software, two or more Cisco Catalyst 5500 switches that control call routing through the networks and that are interconnected through the MG, and two or more Cisco 2600 routers that function as Signaling Link Terminators (SLTs) for termination of SS7 links from the ILEC network. In this arrangement, a LAN is implemented between the MGC components consisting of a fast Ethernet cross-connection between the Catalyst 5500 switches and an SS7 backhaul connection over IP between the switches and the routers. The Cisco VSC3300 software controls the network and also controls interaction between the SS7 network and the MG. The term "virtual switch" as used in the label "Cisco VSC3300 software" is distinct from the term "virtual switch" as used in this disclosure.

In this arrangement, a call placed from telephone 102A is switched through PBX 104A, network 106, and class 4 switch 108 to MG 120A, where voice signals from telephone 102A are packetized. The packetized voice data passes through IP network 122 to MG 120B, which converts the packetized voice data back to TDM voice data that PBX 104B can carry to telephone 102B. These functions occur under the control of MGC 112A, 112B. As a result, a party at telephone 102A can hold a voice conversation with a party at telephone 102B, and the conversation is substantially carried in packetized digital form over IP network 122.

The network arrangement of FIG. 1A is provided as an example. Many variations are possible that share a common set of technical principles, namely the separation of bearer processing from signaling and control into distinct planes, and the introduction of open interfaces among the planes.

In general, bearer plane 128 is responsible for the transport of actual voice data (packet "payload"). Bearer plane 128 can use different protocols, such as IP or ATM and various adaptation layers. Network elements within the bearer plane are not concerned with the specifics of telephony applications. The bearer plane 128 may comprise a conventional IP or ATM network with IP routers or ATM switches, respectively. Media gateways 120A, 120B reside at the edge of the bearer plane; for example, the MGs 120A, 120B can be located at the carrier's central office, or they can be customer premises equipment (CPE). Bearer traffic enters the VoP network 110 through MGs 120A, 120B. Further, in networks that interconnect packet and TDM networks, MGs normally provide for conversion of TDM voice data to packet data and the converse. Switches or routers in network 122 provide a bearer fabric or "data cloud" that moves data packets among endpoints.

The Multiservice Switching Forum (MSF), an industry consortium, further divides bearer plane 128 into an adaptation plane and a switching plane. The switching plane deals with data transport, while the adaptation plane deals with the conversion of voice and adaptation of control functions to the specific bearer medium used. Functions of both the switching plane and adaptation plane can be implemented in the same physical device, under MSF guidelines.

Control plane 124 is responsible for signaling processing and call control and contains call processing intelligence in the form of MGCs 112A, 112B. The MGCs 112A, 112B control corresponding MGs 120A, 120B by instructing them when to set up or tear down connections, requesting notification of specific events for further processing, etc. MGCs 112A, 112B contain all programmatic logic required for telephony applications, including SS7 signaling termination, directory functions, and the collection of accounting information. The MSF further defines an application plane on top of the control plane, an understanding of which is not pertinent to the present disclosure.

Collectively, the bearer plane and control plane provide functionality that is analogous to that of conventional PSTN switches. Therefore, a set of one or more MGs and one or more associated MGCs are referred to herein as a "virtual switch." The term "virtual switch" as used herein differs from a similar term, "soft switch," which is sometimes used in the industry to refer to a MGC but does not include an associated MG.

Communication between the bearer plane 128 and control plane 124 in general, and between an MG 120A, 120B and a corresponding MGC 112A, 112B in particular, involves call control functions, signaling backhaul functions, and resource coordination functions. Call control functions involve proper allocation of network resources to calls, such as setting up and tearing down connections, or connection up-speeding for fax calls. Call control also involves creating records of the use of network resources that may be used as a basis for creating call data records that are used in billing services of the network provider.

Signaling backhaul relates to termination of signals. In general, signaling terminates at an MGC and not at an MG. In arrangements where signaling is physically connected through a line of the MG, e.g., channel associated signaling or primary rate interfaces, lower signaling layers such as Layer 2 are terminated at the MG. However, Layer 3 signals are backhauled to the MGC.

Resource coordination involves communicating information about the bearer plane components to the control plane, and information about the control plane components to the bearer plane. For example, the MGC is informed of certain properties of the MG, such as the available endpoints or their state. Resource coordination allows MGC and MG to directly exchange this information without requiring external provisioning.

Interfaces for the foregoing functions can be provided through one or several control protocols. For example, MGCP provides for call control and also can be used to an extent for signaling backhaul and aspects of resource coordination. Stream control transmission protocol (SCTP) may be used for signaling backhaul.

Figure 2A:
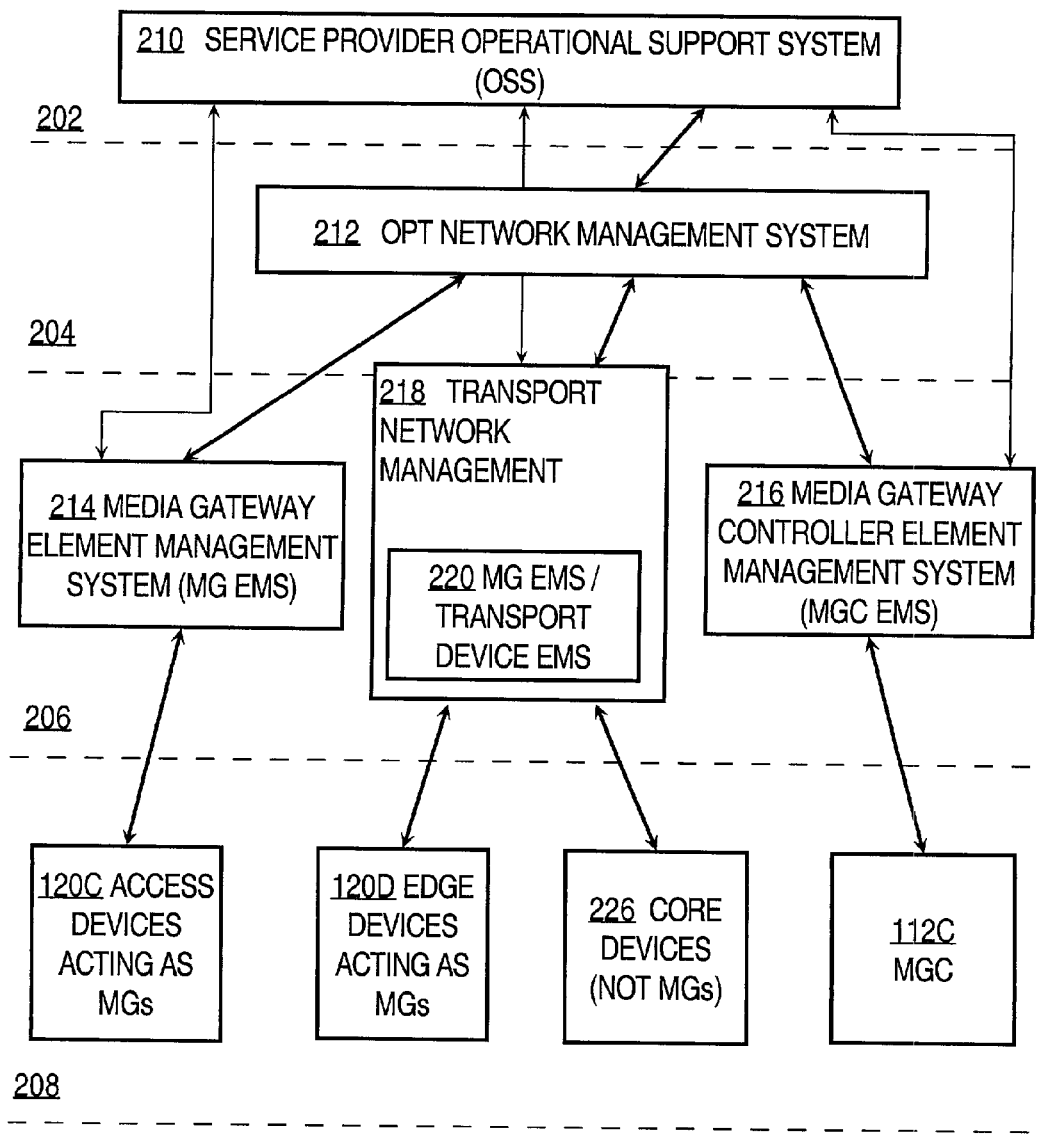
FIG. 2A is a block diagram of an OPT network management system and its relationship to other logical elements of a network management system.

FIG. 2A is a block diagram of an OPT network management system and its relationship to other logical elements of a network management system. The arrangement of FIG. 2A generally comprises a service management layer 202, network management layer 204, element management layer 206, and network element layer 208.

Network element layer 208 represents the logical position of network devices in a network. Network element layer 208 may comprise, for example, one or more access devices acting as media gateways 120C; one or more edge devices acting as media gateways 120D; one or more core devices 226, which do not act as MGs; and one or more media controllers 112C.

Element management layer 206 comprises components that manage elements in network element layer 208. Typically, the components of element management layer 206 comprise software application programs that are executed on workstations that are communicatively coupled to the elements of layer 208 or to a network in which they participate. In one example arrangement, layer 206 comprises a media gateway element management system 214 that manages MGs; a transport network management system 218 that manages edge devices 120D and core devices 226; and a media gateway controller element management system 216 that manages MGC 112C.

Service management layer 202 comprises an operational support system (OSS) that provides supervisory level control of the MG EMS 214, transport network management system 218, and the MGC EMS 216. Known OSS solutions from, for example, Telcordia or other vendors provide service order entry, service definition, and service provisioning functions.

Historically no commercial products have provided functionality for network management layer 204. In an embodiment, however, an OPT network management system 212 is placed in network management layer 204 and includes, among other elements, a virtual switch view and one or more virtual switch objects. The virtual switch view provides configuration management functions and may be used for other functions. OPT network management system 212 is configured in a highly scalable manner because it provides a single, overall management entry point into the OPT network. For example, flow-through interfaces are provided to enable programmatic functions of components of layer 206 to access the OSS 210. Further, an interface to an element management system is not required. For example, in environments in which no element management system is available, it is still possible for OPT network management system 212 to reach devices and have them under the scope of the OPT network management system by interfacing to a configuration delivery and retrieval engine, or by interfacing directly to the devices.

Figure 2B:
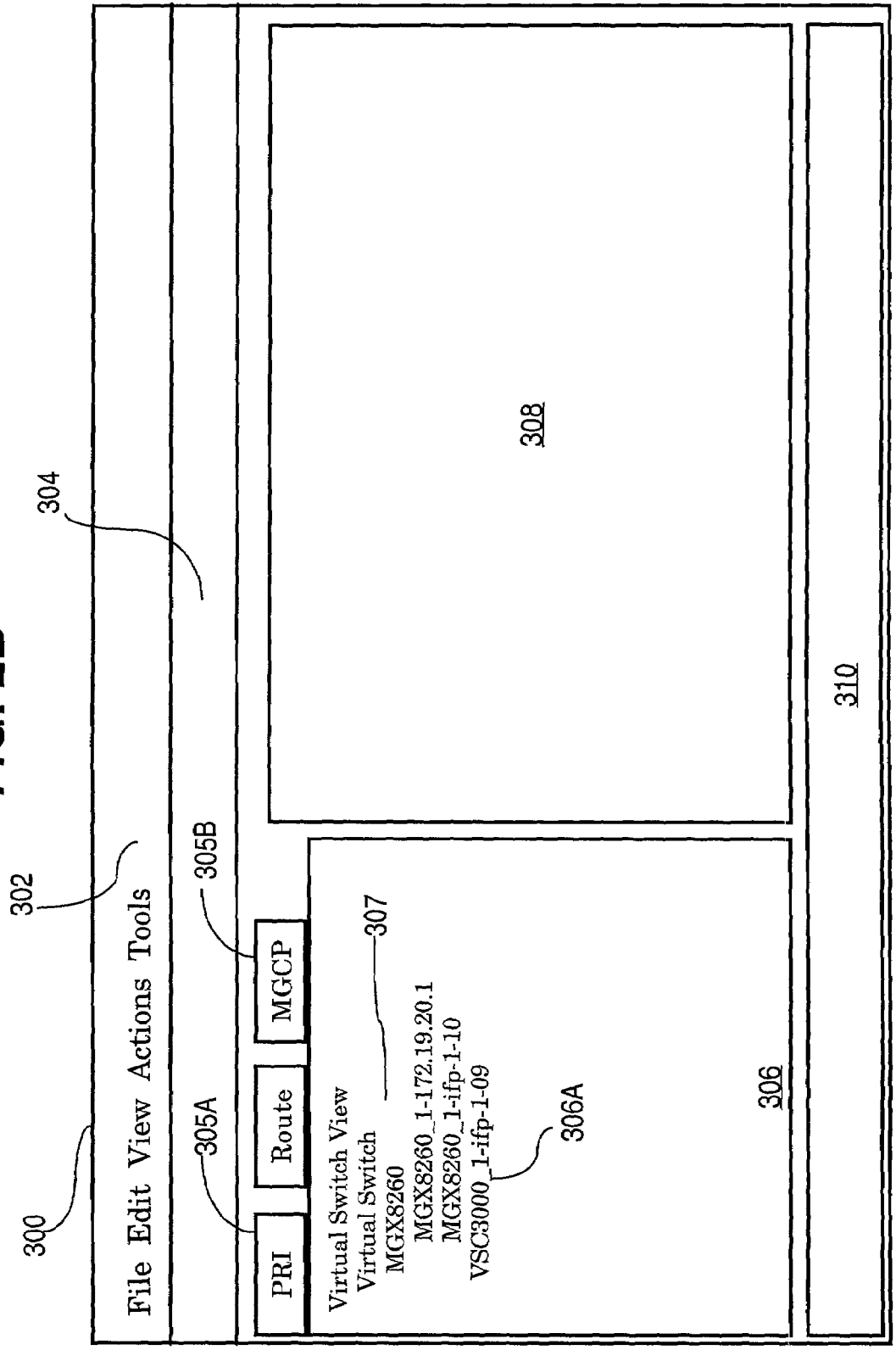
FIG. 2B is a block diagram of a graphical user interface that may be generated in an embodiment.

FIG. 2B is a block diagram of a graphical user interface that may be generated in an embodiment. OPT network management system 212 may provide a graphical user interface (GUI) for facilitating human interaction with its functions. In one embodiment, a GUI 300 comprises a menu bar 302, toolbar 304, view tabs 305A, 305B, a tree view 306 that includes a tree 306A of one or more virtual objects, network topology map area 308 with sub-maps, and object holding area 310.

A detailed description of an example embodiment of a GUI is also provided in pp. 33-163 of the above-referenced Provisional application.

In these embodiments, operations on the constituent elements of a virtual switch may be carried out by selecting one of the view tabs 305A, 305B or functions in toolbar 304. In response, OPT network management system 212 displays appropriate information or data entry fields in map area 308. A user may graphically drag virtual objects from tree view 306 and drop the objects in map area 308 in order to provide certain kinds of user input. For example, adding a PRI backhaul connection to a virtual switch may involve dragging an icon representation of a virtual switch from tree view 306 and dropping the icon in map area 308 in a specified data entry field, then providing one or more parameter values.

Other specific GUI operations are described herein with reference to FIGS. 5A-5D. Use of a GUI is not essential to an embodiment. A GUI merely represents one example framework that may be used to manipulate virtual switch objects. In other embodiments, virtual switch objects may be manipulated programmatically through an appropriate API or other interface. Such an API may include function calls that provide the operations described herein that act upon virtual switches as atomic objects.

Virtual Switch Information Model

According to one embodiment, a virtual switch information model is provided. The virtual switch information model includes a virtual switch object and supporting objects in the form of one or more classes that are defined using an object-oriented programming language. The virtual switch object model encapsulates OPT network elements, such as MGCs and MGs. Virtual switch operations are provided in the information model for operating on a virtual switch, encapsulating individual operations that are to be sent to the network elements that underlie the other objects that it comprises. Network operators can manipulate one or more virtual switch objects using graphical representations of them that are displayed by a network management application, such as OPT network management system 212. In response, the network management application carries out operations on the actual OPT network elements that are encapsulated by the virtual switch. Thus, network operators can indirectly manipulate OPT network elements in a manner that is analogous to conventional manipulation of TDM components by using the virtual switch, without having to deal with details of the OPT network elements. As a result, the work required by operators, and the number of errors interjected by operator actions, are reduced.

According to one embodiment, a virtual switch encapsulates functions of MGs, MGCs and control communications between the MGs and MGCs. For example, a virtual switch object may represent an MGC, or a collection of MGCs backing each other up for reliability reasons; a set of MGs that are controlled by the MGC; and control connectivity between them, including control communications and transport connections necessary to carry the control protocols.

Numerous network management applications can use a virtual switch. For the purpose of illustrating an example, the description herein focuses on a configuration management application. However, embodiments are not limited to this context, and can be used in other areas of OPT management.

Figure 3:
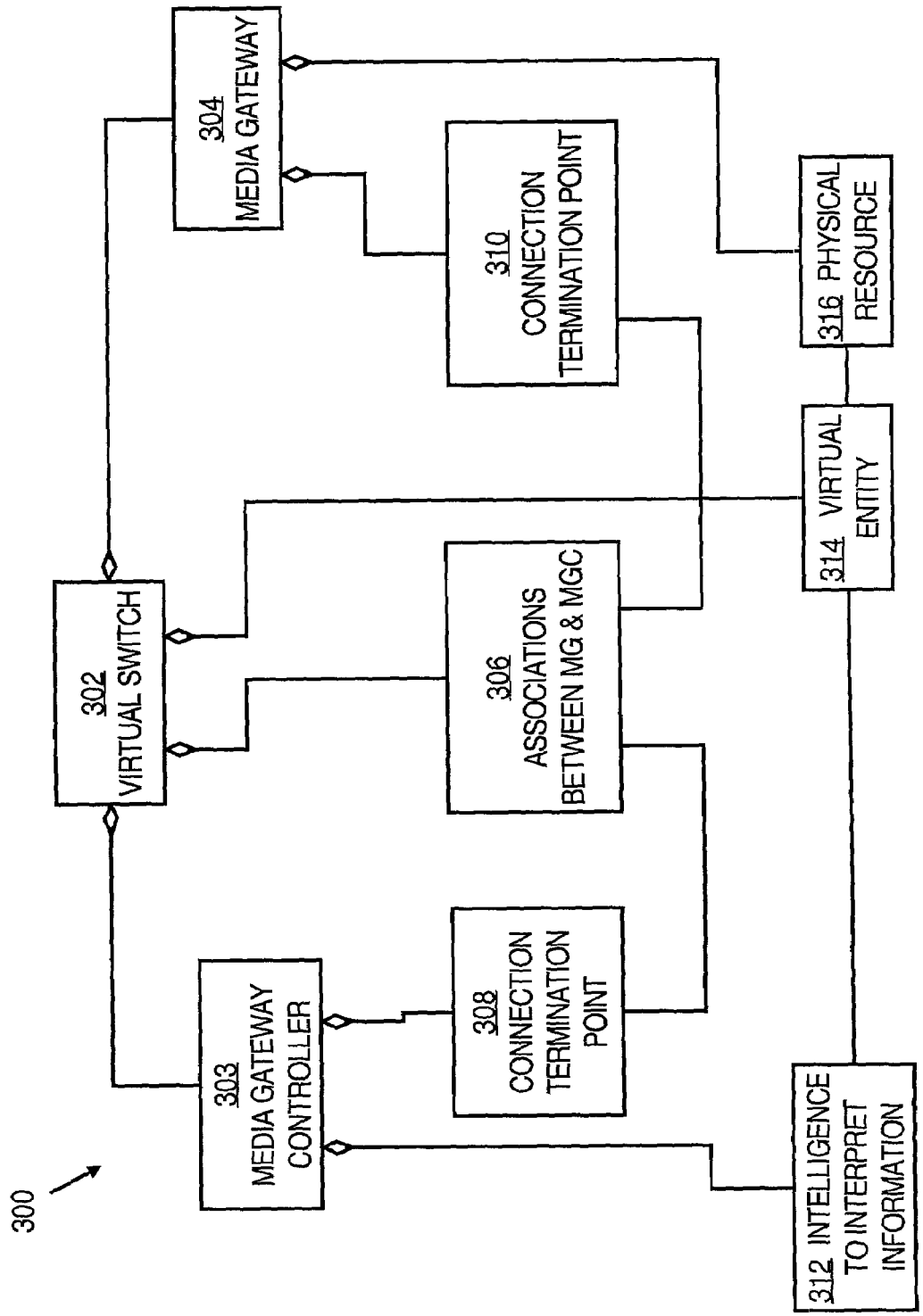
FIG. 3 is a block diagram depicting a virtual switch information model, according to one embodiment.

FIG. 3 is a block diagram depicting a virtual switch information model, according to one embodiment. In general, a virtual switch information model 300 includes objects and methods of those objects that the OPT management applications are based on and can use. Thus, one technique for implementing the virtual switch model is to have the objects that comprise the virtual switch model reside at the OPT network management system layer.

Virtual switch information model 300 comprises a virtual switch object 302 that consists of one media gateway controller object 303 and one or more media gateway objects 304. Virtual switch object 302 also may have one or more association objects 306 that represent associations between an MG and an MGC, such as a control connection, backhaul connection, etc. Virtual switch object 302 also may have one or more virtual entity objects 314, which may represent virtual trunks, virtual trunk groups, D-channel trails, etc.

The media gateway controller object 302 may have one or more connection termination point objects 308 that represent, for example, a control connection termination point, a backhaul connection termination point, etc. Media gateway controller object 302 also may have one or more intelligence objects 312 that represent intelligence to interpret information, such as trunk information, trunk group information, IP path information, etc.

The media gateway objects 304 each comprise one or more connection termination point objects 310 that are substantially similar in structure and function to connection termination point objects 308. Media gateway objects 304 further may have one or more physical resource objects 316, which represent DS1 lines, DS0 lines, D-channels, and other physical resources that form a part of a media gateway.

The virtual switch model may include two categories of managed object classes (MOs) comprising one or more virtual switch level managed objects (VS MOs), and one or more media gateway managed objects (MG MOs) and media gateway controller managed objects (MGC MOs) that relate to constituent elements of the virtual switch. In general, these two categories of MOs constitute network-layer abstractions and aggregations, which are built on objects of the element-management layer. Virtual switch MOs are complemented by classes that model the Media Gateways and Media Gateway Controllers (i.e. the MG MOs and MGC MOs). The MGC MOs and the MG MOs are representations of network elements. One aspect of the virtual switch model lies in how the VS MOs tie MG MOs and MGC MOs together to allow management of the virtual switch as a single atomic entity.

The foregoing elements may be implemented in one or more computer programs that have the structure and functions described in pages 33 to 310, inclusive, of the above-referenced Provisional application, to which the reader is directed for further information. In general, according to one specific embodiment illustrated in such information, a virtual switch comprises the following programmatic objects:

(1) Virtual switch managed object: A virtual switch MO is a virtual representation of the following: (a) an MGC, (b) the MGs controlled by the MGC, and (c) the connectivity control between the MGC and the MGs. To an operator the "virtual switch" provides virtual switch operations.

(2) Virtual Trunk: A virtual trunk comprises (a) the physical termination of the trunk at the MG (e.g., the actual DS0 line) as well as (b) knowledge of the trunk by the MGC, which is referred to as the trunk termination control. This "knowledge of the trunk" allows the MGC to control the trunk. To function properly, control communication needs to be working properly, which can be expressed through a configuration state. Thus, the OPT network elements need to be configured properly for control communications to work properly. Configuration state includes information that enables the determination of whether the OPT network elements are configured properly.

(3) Virtual Trunk group: A virtual trunk group constitutes a grouping of virtual trunks for administration purposes. In general, an MG will have no notion of which DS0s are grouped in a virtual trunk group; this concept of virtual trunk groups applies to the MGC for grouping the MGC's trunk termination controls. The concept of a virtual trunk group is a concept associated with a traditional switch, and therefore is a part of the virtual switch. Virtual trunk groups provide a way of administrating and provisioning trunks as a group. For example, instead of setting up 30 trunks separately, the virtual trunk group provides a mechanism for grouping the 30 trunks into a virtual trunk group and configuring the virtual trunk group as a whole, which in turns results in configuring all of the trunks in the trunk group in a manner that the virtual trunk group was configured.

(4) Virtual D-channel: A virtual D-channel is a representation of a physical termination of a D-channel, or the physical DS0 line that carries the D-channel signaling, at the MG, and the termination of the signaling at the MGC. A virtual D-channel is controlled and processed at the MGC. In addition, to be operable a D-channel requires a working backhaul connection. Again, by managing a virtual D-channel, the fact that an MG and MGC portion are associated with the virtual D-channel, and that backhaul connectivity needs to be managed can be hidden from the operator. As with a virtual switch, tracking virtual D-channels for fallout processing is possible. Tracking D-channel fallout processing involves tracking the fallout to the D-channel components associated with the MG, MGC, and backhaul connection. State can be used to identify D-channel problems related to signaling backhaul communications.

The following other objects may be provided in an embodiment, and relate to elements in a traditional network, and therefore are used to support the virtual switch model:

(1) Control connection: represents the MGCP communication, relating the MGCP endpoints on both the MG and the MGC. The control connection object is managed as part of the virtual switch, but can also be viewed independently.

(2) Backhaul connection: represents the communications related to signaling backhaul, using a session manager protocol or SCTP, relating the endpoints on both MG and MGC.

(3) Media Gateway: represents the Media Gateway.

(4) Media Gateway Controller: represents the Media Gateway Controller.

Another embodiment of a virtual switch information model is described in pp. 169-310 of the above-referenced Provisional application. Although the object-oriented programming approach has been used in this discussion, the various components comprising the virtual switch may be implemented using non-object-oriented programming techniques.

Virtual Switch Operations

According to one embodiment, a virtual switch encapsulates many real resources (such as MGCs and MGs) and actions (communications between the MGCs and MGs) that operators are currently required to perform on these real resources. As a result, the OPT network operator (or any applications that may use the virtual switch) is not required to carry out the kinds of complex steps required in managing individual elements in an OPT network. Instead, an operator can think in terms of virtual switch operations. Thus the virtual switch in conjunction with these virtual switch operations provides a simplified mechanism for the operator to manage the real resources that comprise the OPT network. By using the virtual switch operations, the operator triggers an underlying application to perform complex management tasks on behalf of the operator.

Examples of virtual switch operations are as follows: (1) associate/disassociate an MG from a virtual switch, (2) add/remove/modify parameters of a PRI backhaul service, (3) add/remove/modify a trunk, a trunk group, routes, route lists, (4) add/remove/modify a customer, (5) turn up/tear down/modify service for a customer. Each such operation is provided as a single operation, hiding from the user the underlying operational complexity of having to deal with multiple operations across multiple network elements.

In one embodiment implemented using object oriented programming, virtual switch operations are provided as methods on the objects comprising the virtual switch. Internally, each virtual switch operation is decomposed into a series of steps necessary to achieve the desired effect.

Figure 4:
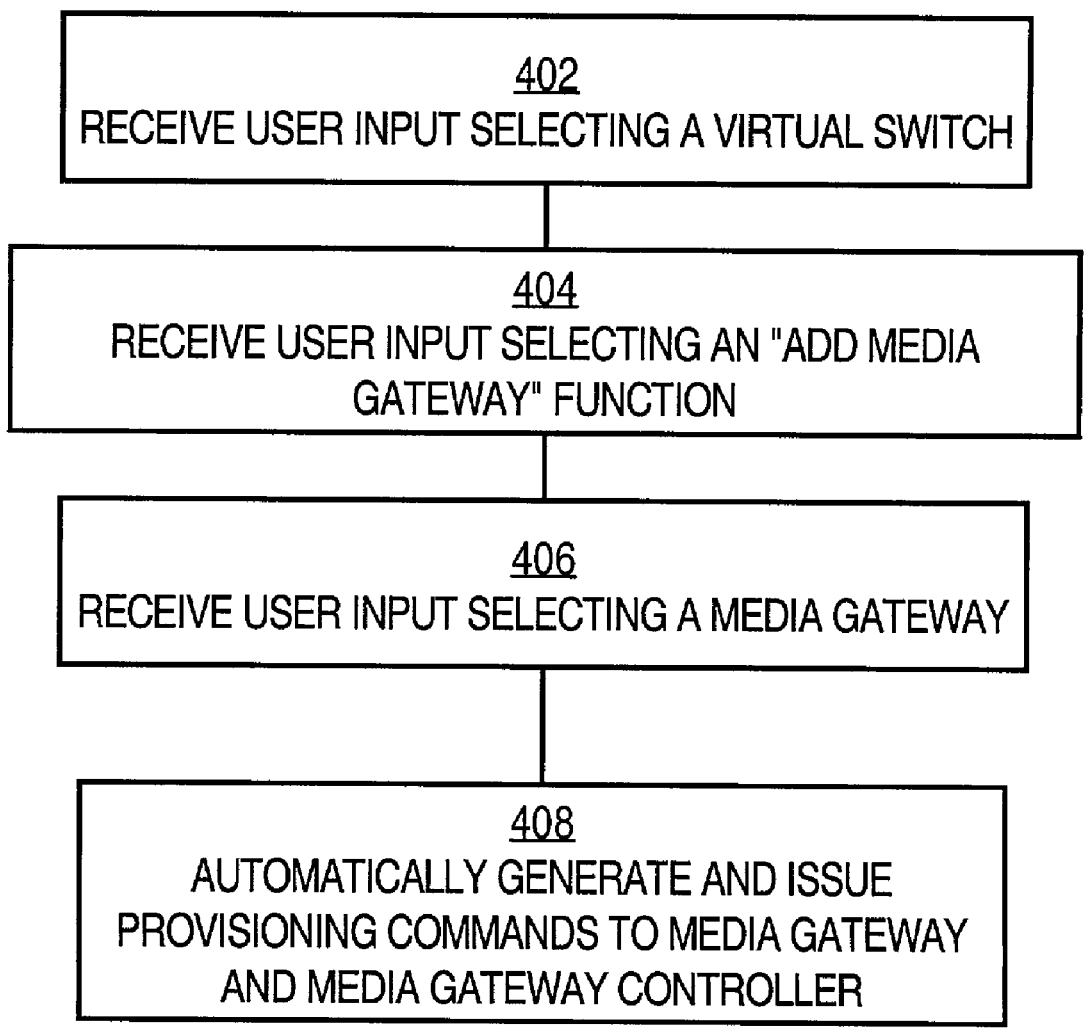
FIG. 4 is a flow diagram illustrating an example process in which an operator uses a virtual switch to associate a media gateway with a media gateway controller to result in offering PRI services.

FIG. 4 is a flow diagram illustrating an example process in which an operator uses a virtual switch to associate a media gateway with a media gateway control to result in offering PRI services.

In block 402, user input selecting a virtual switch is received. For example, a GUI of OPT network management system 210 receives input from a mouse or other cursor movement device that selects a particular virtual switch object that is graphically represented in a network topology display. In block 404, user input selecting an "Add Media Gateway" function is received. For example, input selecting an "Add Media Gateway" function from a toolbar or pull-down menu of the GUI is received. In block 406, user input selecting a media gateway is received. The user input selects or identifies a media gateway object that is graphically illustrated in the network topology display or listed in an inventory list.

In block 408, provisioning commands are automatically generated and issued to the actual media gateway object represented by the media gateway object that was selected in block 406 and to an associated media gateway. Thus, as a result of the operator performing the above steps of block 402-406, OPT network management system 212 automatically sets up MGCP connections on both the MG end and the MGC end, signaling backhaul, etc. The operator does not have to be aware of the system's actions that are taking place under the covers. Removal and configuration modifications work analogously to this example of adding PRI service to a customer.

Block 408 necessarily involves numerous provisioning sub-steps that are omitted from FIG. 4 for illustrating a high-level view of the overall process. In an embodiment, most voice services and features that are the subject of operations of block 408 will involve coordinated provisioning of multiple network elements. For example, block 408 may involve setting line parameters on the media gateway controller, setting inter-connection parameters between them, and establishing end-to-end connection management parameters within the network. As a specific example, for turning up PRI service for a customer, block 408 may cause OPT network management system 212 to take the following actions:

1. Set up a MGCP control association; this will involve adding MGCP terminations at both the media gateway and media gateway controller;
2. Add a line with TDM endpoints and a CCS channel on the selected media gateway;
3. Instruct the media gateway controller to add a new trunk group and associate it with the customer;
4. Instruct the media gateway controller to add the trunks;
5. Associate the trunks with the corresponding media gateway endpoint;
6. Verify a signaling backhaul connection has been set up, which may involve separately verifying a primary backhaul connection and a secondary backhaul connection;
7. Set up a signaling backhaul connection if required; this may involve adding signaling backhaul terminations at both the media gateway and media gateway controller, and may involve setup of a Layer 2 connection to carry the signaling backhaul connection, such as a permanent virtual circuit in an ATM switch;
8. Set up a cross-connect between the CCS channel and the signaling backhaul connection at the media gateway, if required, as determined by the type of media gateway.

Different network solutions may have different configuration rules for virtual switches. For example, the selected control protocol may differ, or the solution may apply to VoAAL1, VoAAL2, or VoIP. Similarly, if the MG and MGC are interconnected using ATM switches, an operator may need to pre-establish PVPs or PVCs to interconnect MGs controlled by the same MGC.

Figure 5A:
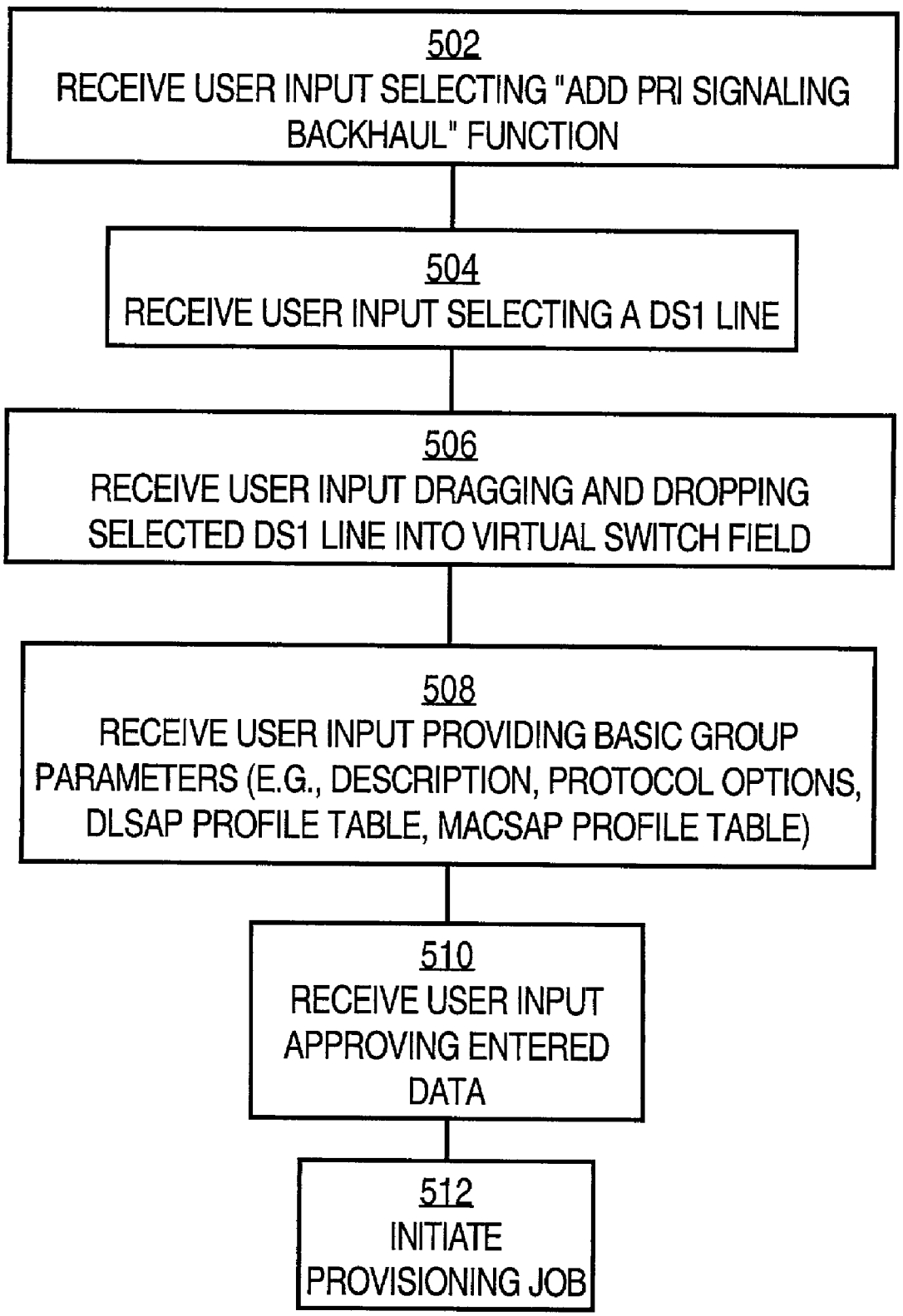
FIG. 5A is a flow diagram of a process of adding a PRI signaling backhaul connection to a virtual switch.

FIG. 5A is a flow diagram of a process of adding a PRI signaling backhaul connection to a virtual switch. In block 502, user input selecting an "Add PRI signaling backhaul" function is received. For example, when OPT network management system 212 provides a graphical user input, block 502 may involve receiving user input that selects a PRI Signaling Backhaul tab and an Add function. In block 504, user input selecting a DS1 line is received. For example, a DS1 in a tree view of the GUI of OPT network management system 212 is selected. For proper operation, the selected DS1 line must have a pre-configured D channel. In block 506, user input dragging and dropping the selected DS1 line into a virtual switch field is received.

In block 508, user input providing basic group parameters is received. In one embodiment, a user selects a Basic Group Parameters tab and enters appropriate values, such as Description, Protocol Options, DLSAP profile table, MAC-SAP profile table, etc. Detailed values for signaling parameters also may be provided.

In block 510, user input approving the previously entered data values is received. Such input may comprise selecting an "OK" button, "SUBMIT" button, etc. In block 512, a provisioning job is initiated to provision the virtual switch and its constituent components as necessary to add a PRI signaling backhaul connection as specified by the user.

Figure 5B:
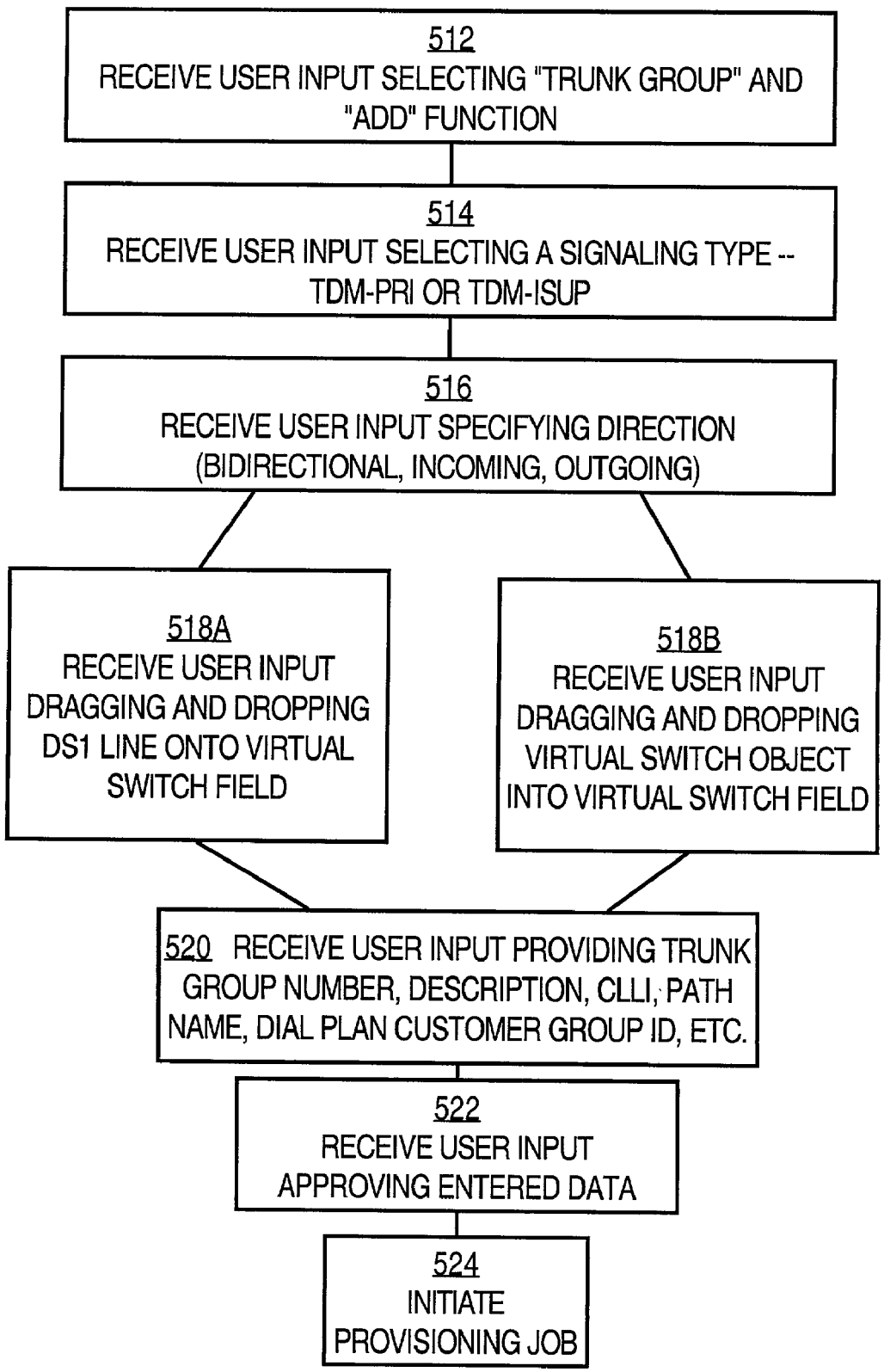
FIG. 5B is a flow diagram of a process of adding a trunk group to a virtual switch.

FIG. 5B is a flow diagram of a process of adding a trunk group to a virtual switch. A trunk group is a logical grouping of trunks that exist in an MGC node. Trunk groups are used to associate incoming trunks with a dial plan and associate outgoing trunks with route lists. For different signaling types, the trunk group has different signaling associations. For example, for the TDM-PRI signaling type, the trunk group is associated with one and only one PRI backhaul connection. For the FAS signaling type, the trunk group is associated with one DS1. For the NFAS signaling type, the trunk group is associated with multiple DS1s. For the TDM-ISUP signaling type, all trunks in a trunk group have one destination point code (DPC).

In block 512, user input selecting a Trunk Group function area and Add function is received. For example, a user may select a Trunk Group tab and an Add function within the tab. In block 514, user input selecting a signaling type is received; the signaling type may be TDM-PRI or TDM-ISUP. User input specifying a direction, selected from among Bi-directional, Incoming, or Outgoing, is received in block 516.

If PRI was selected as the Signaling Type, then in block 518A, user input dragging and dropping a DS1 line onto a virtual switch field is received. Alternatively, if ISUP was selected as the Signaling Type, then in block 518B, user input dragging and dropping a virtual switch object into the virtual switch field is received. This operation selects a particular virtual switch in the network that will be the subject of processing.

In block 520, user input providing basic group parameter values is received. The basic group parameter values may include a trunk group number, description, etc., as indicated in block 520. In block 522, user input approving the entered data is received, and in block 524, a provisioning job is initiated. The provisioning job adds a trunk group to the MG and MGC that comprise the selected virtual switch.

Figure 5C:
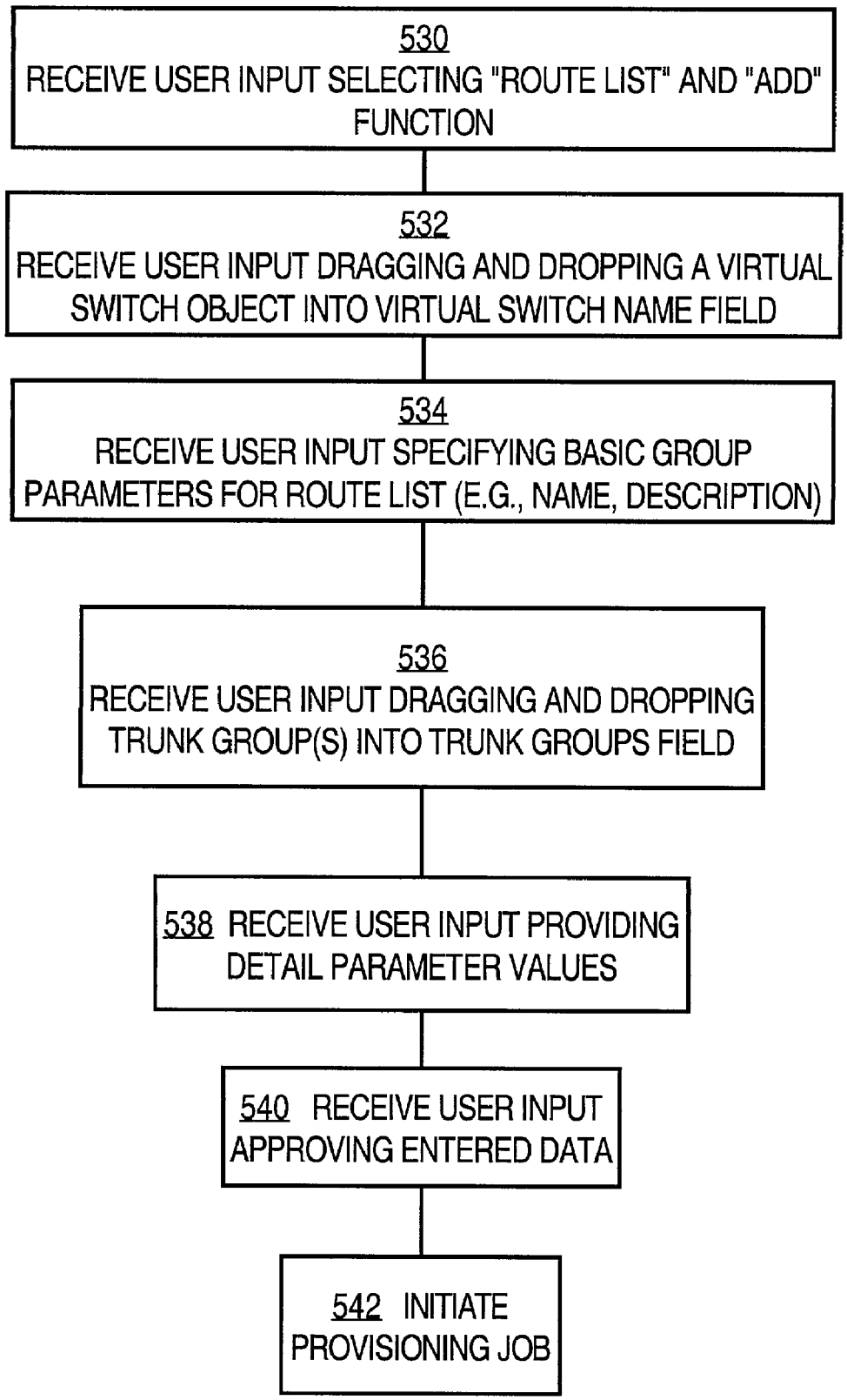
FIG. 5C is a flow diagram of a process of adding a route list to a virtual switch.

FIG. 5C is a flow diagram of a process of adding a route list to a virtual switch. In block 530, user input selecting a Route List function area and Add function is received. For example, a user may select a Route List tab from the GUI of OPT network management system 212 and then select an Add function. In block 532, user input dragging and dropping a virtual switch object into a virtual switch name field of the GUI is received. This operation selects a particular virtual switch in the network that will be the subject of route list processing. User input specifying basic group parameters for the route list, such as a name and description, are received in block 534.

In block 536, user input dragging and dropping one or more trunk groups into a trunk groups field is received. This operation informs the OPT network management application about a proposed association of trunk groups to the selected virtual switch. In block 538, user input providing detailed parameter values is received. This operation enables a user to provided values that are more detailed for each selected trunk group. In block 540, user input approving the previously entered values is received, and in block 542, a provisioning job is initiated to actually associate the designated trunk groups with constituent elements of the virtual switch in the network.

Figure 5D:
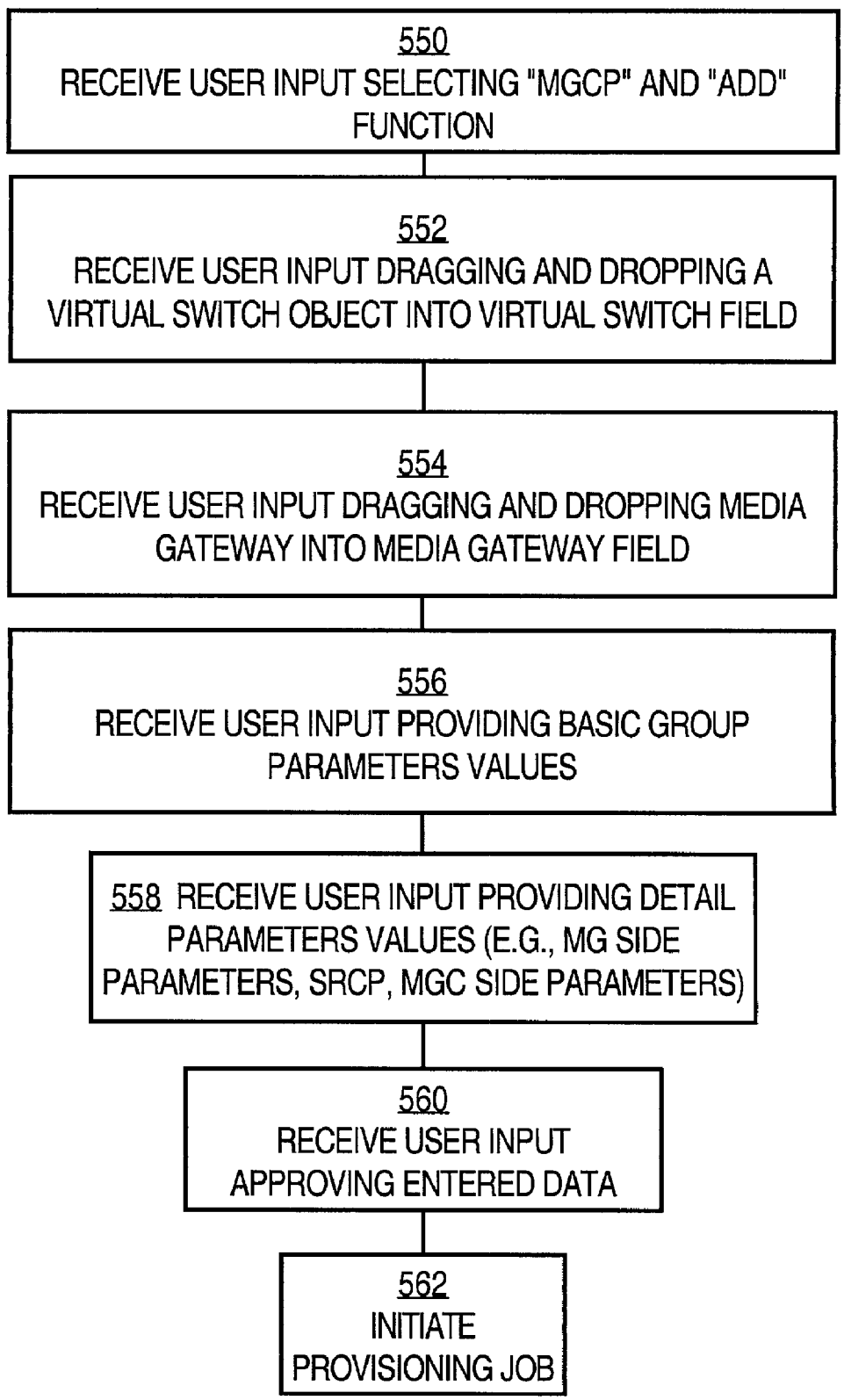
FIG. 5D is a flow diagram of a process of adding a media gateway association to a virtual switch.

FIG. 5D is a flow diagram of a process of adding a media gateway protocol (MGCP) association to a virtual switch. In block 550, user input selecting an MGCP function area and an Add function is received. For example, a user may select an MGCP tab of the GUI of OPT network management system 212. In block 552, user input dragging and dropping a virtual switch object into a virtual switch field is received. This operation identifies a virtual switch that will be the subject of an association. In block 554, user input dragging and dropping a media gateway object into a media gateway field is received. This operation identifies a MG that will participate in an association.

In block 556, user input providing basic group parameter values is received. In block 558, user input providing detailed parameter values, such as MG side parameters, SRCP values, MGC side parameters, etc. In block 560, user input approving the previously entered values is received. In block 562, a provisioning job is initiated to create an MGCP association between the selected virtual switch and MG.

Figure 6:
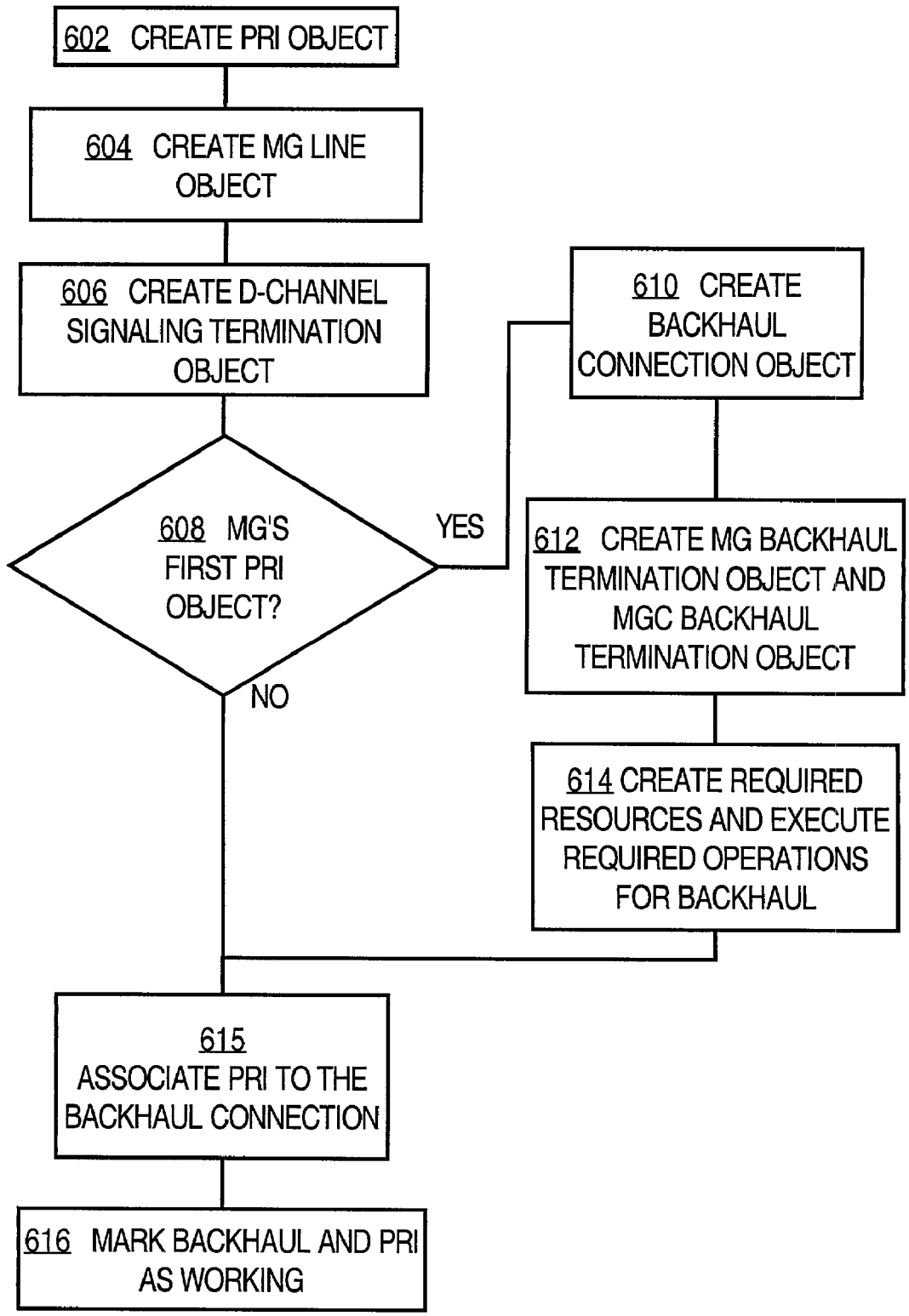
FIG. 6 is a flow diagram of steps that may be carried out in response to a request to create a backhaul connection.

FIG. 6 is a flow diagram of steps that may be carried out in response to a request to create a PRI signaling backhaul connection. In block 602, an object that represents the PRI is created, which depends on other entities such as: (a) a representation of a DS1 line together with its D-Channel signaling from the network that connects to the MG (hereinafter the physical line shall be referred to as the "MG line" and the object that represents this "MG line" shall be referred to as "MG line object") and (b) a representation of the PRI in the form of a D-Channel termination at the MGC (hereinafter referred to as "D-Channel termination object"). As part of PRI object creation, the MG line object and the D-Channel termination object need to be created.

In block 604, an MG line object is created. As part of creating the MG line object, a request is dispatched to the lower-layer system (i.e., the MG or the MG's element management system) to instruct the MG to configure the DS1 line together with its D-Channel signaling on the MG, so the MG line object is associated with the physical MG line that the MG line object presents.

In block 606, a D-Channel signaling termination object 220 is created. As part of creating the D-Channel signaling termination object, a request is dispatched to the lower layer system to instruct the MGC to create a PRI signal path to terminate the D-Channel signaling backhauled from the MG's line that has been added.

In block 608, a test is carried out to determine whether the PRI object created in block 602 is the first PRI object associated with the current MG. If so, then control passes to block 610, in which a backhaul connection object is created.

In block 612, objects that the backhaul connection object depends on are created. The backhaul connection object resulting from block 610 in turn depends on other objects that have to be created, namely the objects that represent the backhaul terminations on both MG and MGC. The object that represents the backhaul termination at the MG is the "MG backhaul termination object" and the object that represents the backhaul termination at the MGC is the "MGC backhaul termination object".

In block 614, one or more required resources are created and one or more operations are executed to support backhaul. Creation of the MG and MGC backhaul termination objects leads to dispatching requests to the lower layer systems to create the required resources and execute the required operations on the actual MG and MGC devices as a part of the creation of the respective objects. For example, protocol endpoints for signaling backhaul based on session manager protocol or SCTP are set up on the actual MG and MGC.

In block 615, the PRI is associated to the backhaul connection. If the backhaul connection already exists, the association of the PRI to the backhaul connection is created. If the backhaul connection doesn't exist, an association to a new backhaul connection is created; the association is required to be created first.

Upon successful creation of the MG and MGC backhaul termination objects the backhaul connection object is marked as working, as shown in block 616. Further, the PRI is marked as working, since all the dependent objects are in place and in working condition.

In an embodiment, fallout processing is provided in the event that a step fails. Further, depending on the actual devices slight differences in the steps of FIG. 6 may be carried out, which the objects and the object mapping to the "real resources" encapsulate.

The virtual switch described herein can be used not only to configuration management tasks but also to flagging inconsistencies in an existing OPT network configuration. Where objects are used to represent OPT network elements and relationships between those elements, flagging OPT network configuration inconsistencies (hereinafter referred to as "inconsistency flagging") can be done by analyzing whether there are mismatches in the dependencies that the objects in the model have with other objects in the model. Inconsistency flagging can be used to relieve many problems for existing OPT operators, where the operator may have introduced an inconsistent configuration. Without inconsistency flagging, an operator does not have a good way of identifying inconsistencies between devices in a configuration.

One technique for quick identification of inconsistencies in the underlying network configuration is to associate one or more state attributes with the various objects that comprise the virtual switch. Configuration inconsistency occurs, for example, when an MGC is configured to control a particular MG but that particular MG is not configured to be controlled by that MGC. Inconsistency detection also may be carried out with respect to a virtual entity such as the virtual switch. For example, if the objects that the virtual entity depends on violate one or more integrity constraints, it can be concluded that the virtual switch itself is inconsistent and hence network-level configuration integrity violated. A simple example would be one of the dependent objects not referencing the other where it would be required (for instance, an MG not pointing to the MGC that is supposedly controlling it, e.g. pointing to a different IP address). Similarly, if one of the dependent objects indicates that it is not operational, or not installed, it can be concluded that the virtual entity as a whole is not operational.

Inconsistency detection can occur when the information in the object model is synchronized with the actual information in the network. As part of synchronization, the virtual entity objects may check if the newly synchronized information is still consistent. This can be invoked whenever an object that is part of a virtual entity changes (or is synchronized).

OPT Network Management System

An OPT network management system 212 based on a virtual switch object model as disclosed herein may operate in coordination with element management systems 214, 216, 218. For example, the element management systems may be used for management tasks that are unrelated to voice or otherwise element-specific. The element management systems may carry out backup and restore of individual configuration data, downloading of software images, etc. However, an element management system is not required. For example, in environments in which no element management system is available, it is still possible for OPT network management system 212 to reach devices and have them under the scope of the OPT network management system by interfacing to a configuration delivery and retrieval engine, or by interfacing directly to the devices.

OPT network management system 212 may provide a graphical user interface to facilitate user interaction, as described in pp. 33-167 of the above-referenced Provisional application. For example, a particular screen may receive parameters for provisioning a virtual switch. To increase user productivity, basic parameters that must be supplied are treated separately from the rest of the parameters whose configuration by the user is optional and for which the system will provide defaults. Wizard-driven screens can be invoked for the configuration of special parameters.

Many of the provisioning operations of the OPT network management system 212 lead to multiple management requests issued to one or more of the element management systems shown in FIG. 2A. Within OPT network management system 212, such requests may be represented as network management transactions or provisioning jobs. The OPT network management system 212 may comprise a provisioning job manager to provide a reliable way of managing such transactions. An operator may monitor job progress using a Job Listing tab that displays details of a particular job. This allows operators to know the actual status of provisioning at any point in time and to infer, in cases of failures, what went wrong.

Fault management functionality associated with management of a virtual switch includes integrated alarm reporting, de-duplication, correlation, and impact analysis. Examples of when event fault correlation would be used are the network is running and something in the network breaks such as a backhaul connection or someone unplugs a device. Since the OPT network elements are separate entities and each of these separate entities may detect the same error and generate an alarm for this same error, there is a need for correlating duplicate alarms and reducing the duplicate alarms down to one alarm (hereinafter referred to as de-duplication). One technique for providing de-duplication is via the virtual switch because the virtual switch has knowledge of the network elements and therefore can process all of the alarms generated in the network elements in the virtual switch to de-duplicate the alarms.

As a specific example, both MG and MGC will report a control connectivity disruption, even if the component at fault is the port of a switch through which all control communications is carried. In this example, the OPT network management system 212 can de-duplicate the alarm and indicate the loss of control connectivity as well as loss of service on the affected trunks as the impact or symptoms. Alarms received from multiple element management systems are first normalized, by applying consistent component names within the alarms, and sent to a de-duplicating process. Based on predefined or user-defined rules, multiple alarms for the same fault are de-duplicated into a single alarm, and displayed in an alarm browser, with information on impacted network elements and service impact.

In one embodiment, event correlation is facilitated using an event browser that is integrated in OPT network management system 212. An example embodiment of an event browser is described in pp. 127-139 of the above-referenced Provisional application. Use of an event browser is not essential to an embodiment, but provides a convenient way to view and evaluate environmental events that relate to OPT network management system 212. Event correlation also may be is facilitated using a log browser that is integrated in OPT network management system 212. An example embodiment of a log browser is described in pp. 140-143 of the above-referenced Provisional application. Use of a log browser is not essential to an embodiment, but provides a convenient way to view and evaluate environmental events that relate to OPT network management system 212.

Performance, accounting, and security management functions may be provided. For example, accounting data is typically collected by the MGC but not maintained at the MG, as all relevant data is conveyed to the MGC as part of control communications, for instance, when tearing down a connection. Accordingly, no correlation of accounting data is required.

In an embodiment, OPT network management system 212 enables a user to manage network elements that are not part of a virtual switch. For example, the network topology display may include "orphaned" MGs that are not associated with or "owned by" an MGC.

Virtual Entity Approach for H.323 Opt Networks

A. Overview

A virtual entity approach particularly suited to use in H.323 OPT networks is now described. This description assumes that the reader is familiar with the H.323 recommendation and use of H.323-compliant network elements in an OPT network, with general principles of voice telephone network technical architecture, with call processing and signal processing methodologies, and with the role of H.323 network elements, such as gatekeepers and gateways.

The H.323 virtual entity approach herein takes into account certain key differences between H.323 and MGCP based networks that impact how they are managed. For example, in H.323, call-processing intelligence is distributed according to a model that is far more decentralized than that of MGCP. In H.323 OPT networks, gateways actually process signaling information, whereas MGCP uses a more centralized model revolving around "intelligent" media gateways controllers that control "dumb" media gateways. As a result, the H.323 approach uses virtual entities other than the virtual switch described above.

In the H.323 approach herein, virtual programmatic entities represent Signaling Controllers and Route Servers. Signaling Controllers provide for conversion between signaling not understood by a gateway, such as SS7, to signaling that the H.323 gateway can process, such as Q.931. Route Servers might be co-deployed with the actual H.323 components (gateways, gatekeepers, directory gatekeepers) as part of those networks. The virtual entities described herein can guide provisioning activities in H.323 networks and support applications such as network-level configuration mismatch detection.

The virtual entities are supported by processing methods that facilitate network management in a holistic manner, rather than an element-centered manner that would require users to deal with the distribution aspects of voice functionality. In one specific embodiment, the virtual entities comprise one or more virtual zones, virtual zone connections, and virtual gateways.

Figure 1B:
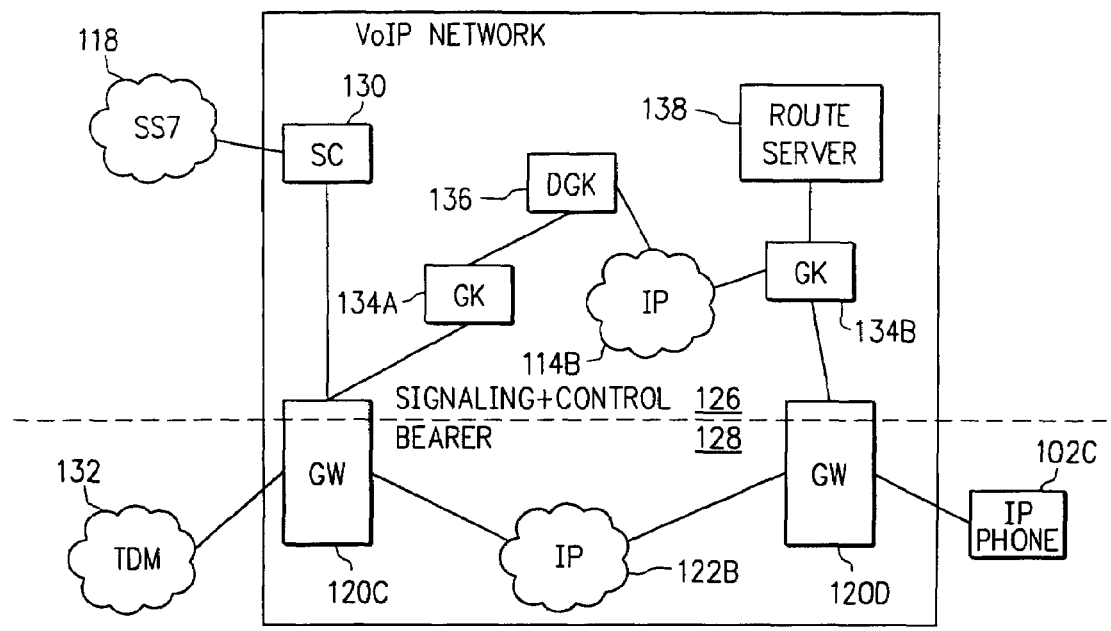
FIG. 1B is a block diagram of an example of an H.323-based open packet telephony network.

FIG. 1B is a block diagram of an example of an H.323-based open packet telephony network. A bearer plane 128 comprises a TDM network 132 that is communicatively coupled to a first gateway 120C, which provides an interface to an IP network 122B. Logically opposite gateway 120C is a second gateway 120D, which couples voice call information to an IP phone 102C or other end station.

In a signaling and control plane 126, an SS7 network 118 is communicatively coupled to a signaling controller 130, which terminates SS7 signaling and provides an interface to gateway 120C. A first gatekeeper 134A is coupled to a directory gatekeeper 136, which is connected to IP network 114B. A second gatekeeper 134B receives signaling and control information and communicates with gateway 120D. A route server 138 may cooperate with gatekeeper 134B for performing route selection and other services.

Figure 1C:
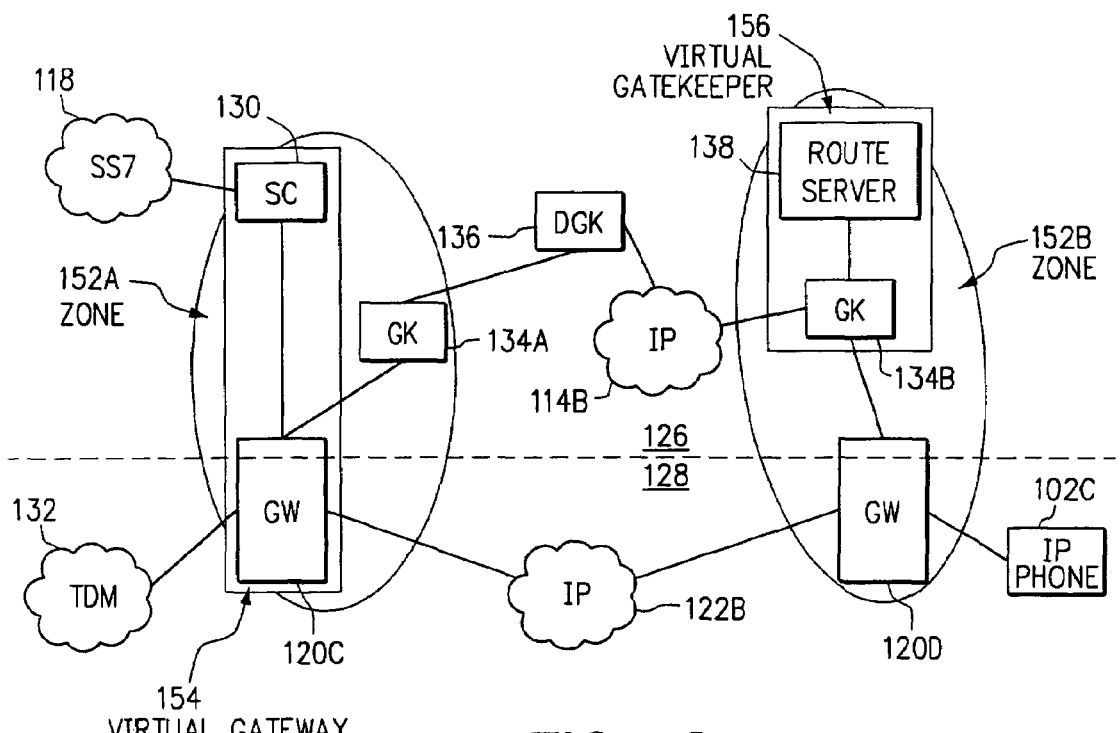
FIG. 1C is a block diagram of the network of FIG. 1B, additionally illustrating certain virtual entities.

FIG. 1C is a block diagram of the network of FIG. 1B, additionally illustrating certain virtual entities. A first virtual zone 152A encapsulates or represents a virtual gateway 154 and the first gatekeeper 134A. Virtual gateway 154 represents a combination of signaling controller 130 and first gateway 120C. A second virtual zone 152B represents a virtual gatekeeper 156 and the second gateway 120D. The virtual gatekeeper 156 represents a gatekeeper 134B and a route server 138, and their connectivity.

Virtual zones facilitate managing the dependencies between gateways, or virtual gateways of the type described below, of the same zone, as well as gateways and gatekeepers. A virtual zone is analogous to a virtual switch as described above for MGCP networks.

Virtual zone connections facilitate managing the dependencies between gatekeepers, between gatekeepers and directory gatekeepers, and between directory gatekeepers.

Virtual gateways facilitate managing the dependencies between signaling controllers, which provide for conversion between different types of signaling, and gateways, which logically terminate the signaling, such that the converted signaling is backhauled between the signaling controller and the gateway.

Virtual gatekeepers facilitate managing the dependencies between gatekeepers and route servers. Virtual gatekeepers, like virtual gateways, can be part of virtual zones, resulting in multiple levels of virtual entities.

In general, virtual gatekeepers serve to hide, from a user, complexities involved in communications of gatekeepers to route servers. Specifically, one function performed by a virtual gatekeeper in the signaling and control plane concerns route selection, for example, resolution of E.164 addresses to network addresses. A gateway communicates with a gatekeeper to perform route selection. Actual performance of route selection may occur in several ways. In one alternative, a gatekeeper, DGK, or a hierarchy of GKs and DGKs perform route selection. In another alternative, a dedicated route server performs route selection. A route server often provides more sophisticated facilities to configure policies that control how routing decisions are made than a GK or DGK. For instance, policies on resolving a route may result in selecting a different route depending on the time of day, on load conditions, or other factors. The gateway communicates with the gatekeeper for a routing decision; however, the gatekeeper also communicates to the route server and requests it to resolve the route, and then communicates the route selection decision back to the gateway. Thus, in this alternative, the gateway acts as a proxy for the route server. Because the route server serves as an extension of the gatekeeper's own route selection function, it is beneficial to treat the combination of gatekeeper and route server as a virtual gatekeeper. This shields users from having to set up and coordinate the connectivity between gatekeeper and route server.

For purposes of illustrating a simple example, FIG. 1B and FIG. 1C illustrate simplified networks having a limited number of gateways, gatekeepers, other elements, and virtual entities. However, in a practical embodiment, there may be any number of such elements.

In this approach, simplified provisioning of H.323-based OPT networks is achieved by projecting the virtual entities onto the physical network to hide the underlying distribution of voice functionality. Provisioning logic, embodied in programmatic provisioning methods or applications, receives user input or programmatic input requesting an operation on a virtual entity, and decomposes the input into one or more operations on constituent managed objects, and into configuration commands issued to one or more network elements or element management systems.

For example, assume that an administrator or application program needs to add a virtual voice port in a virtual gateway. This task is presented as a single operation to the user, but execution of the operation requires interaction with multiple managed objects that need to be created or updated. As a result, the virtual zone generates a sequence of multiple operations, which are hidden from the user, and that are directed at different devices such as a gateway, or signaling controller. Similarly, a graphical view of the network, such as a topology display, is presented in terms of the virtual entities.

The approach also provides a method to detect network-level configuration inconsistencies that lead to erroneous network behavior but are very hard to detect at an element level, helping maintain network integrity. In one embodiment, inherent integrity rules of virtual entities are validated against their constituent managed objects, which reflect the actual resources of the various network elements participating in those higher-level concepts. Validation occurs upon initial discovery. Validation also occurs whenever configuration changes occur in the network that are reflected in a managed object representing the affected resource of the affected network element, for the virtual entities of which that managed object is a part. If a mismatch is identified, then the integrity state of the virtual entity is marked accordingly and can be flagged to a user. An example of a mismatch is violating referential integrity among the managed objects.

Managing an OPT network as if it comprises higher-level virtual entities is useful for several reasons. First, it simplifies the way in which those networks can be managed, by allowing users to think in terms of higher-level concepts to which they can more easily relate because the concepts are analogous to legacy technology. Further, the approaches herein can abstract and aggregate management information and operations of multiple places in the network, leading to more efficient overall network operations.

The approaches herein also allow users to easily flag, or avoid altogether, inconsistencies and error conditions in OPT network configurations. This makes network operations less error prone, decreases service outage and increases network availability. The approaches enable management applications to be built in such a way that OPT management does not result in significant additional operational complexity, as compared with management of a conventional TDM network. Indeed, operational complexity is reduced as management of voice and data are combined. This is a significant advance over the current state of the art, which offers an element-centric view and forces users to deal with configuring each component of the VoIP network individually.

B. Overview of Information Model and its Uses

Figure 8A:
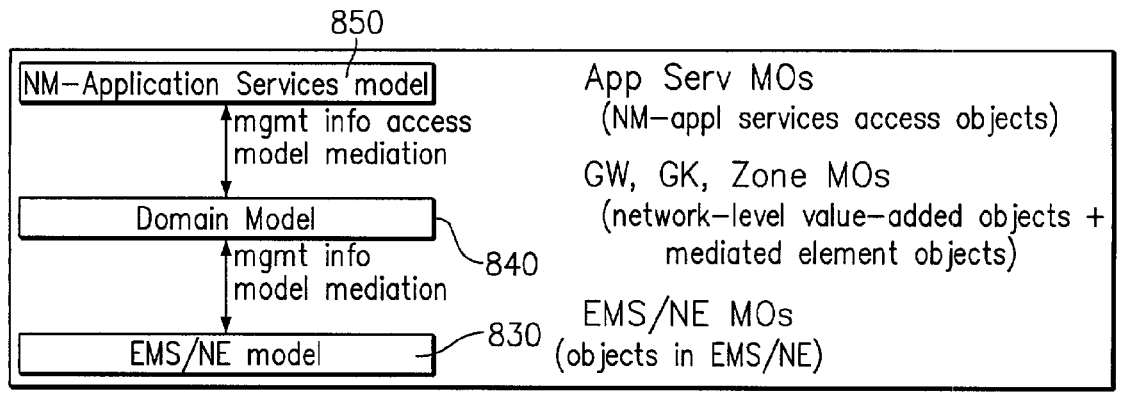
FIG. 8A is a block diagram illustrating a relationship of a plurality of program object models in a complete network management system.

FIG. 8A is a block diagram illustrating a relationship of a plurality of program object models in a complete network management system. The object models comprise a network management/application services object model 830, domain model 840, and element management system/network element model 850. The approaches described herein are directed to domain model 840 and methods of using it.

The element management system/network element model 830 represents objects that are managed in and exposed by element management systems and network elements.

The domain model 840 models all fundamental concepts underlying the managed network. The objects in the domain model 840 include network element managed objects and virtual entity managed objects. Network element managed objects include objects representing gateways, gatekeepers, signaling controllers and their components. Virtual entity managed objects represent concepts that consolidate management information from one or more network element managed objects, and that are not available at the element management level. Examples of virtual entities are Region, Virtual Gateway, Virtual Zone, and Gatekeeper Group.

The management/application services object model 850 represents application services managed objects that are maintained by management applications, and that enhance the domain model 840 with certain functions that facilitate operation of higher-level applications.

Figure 8B:
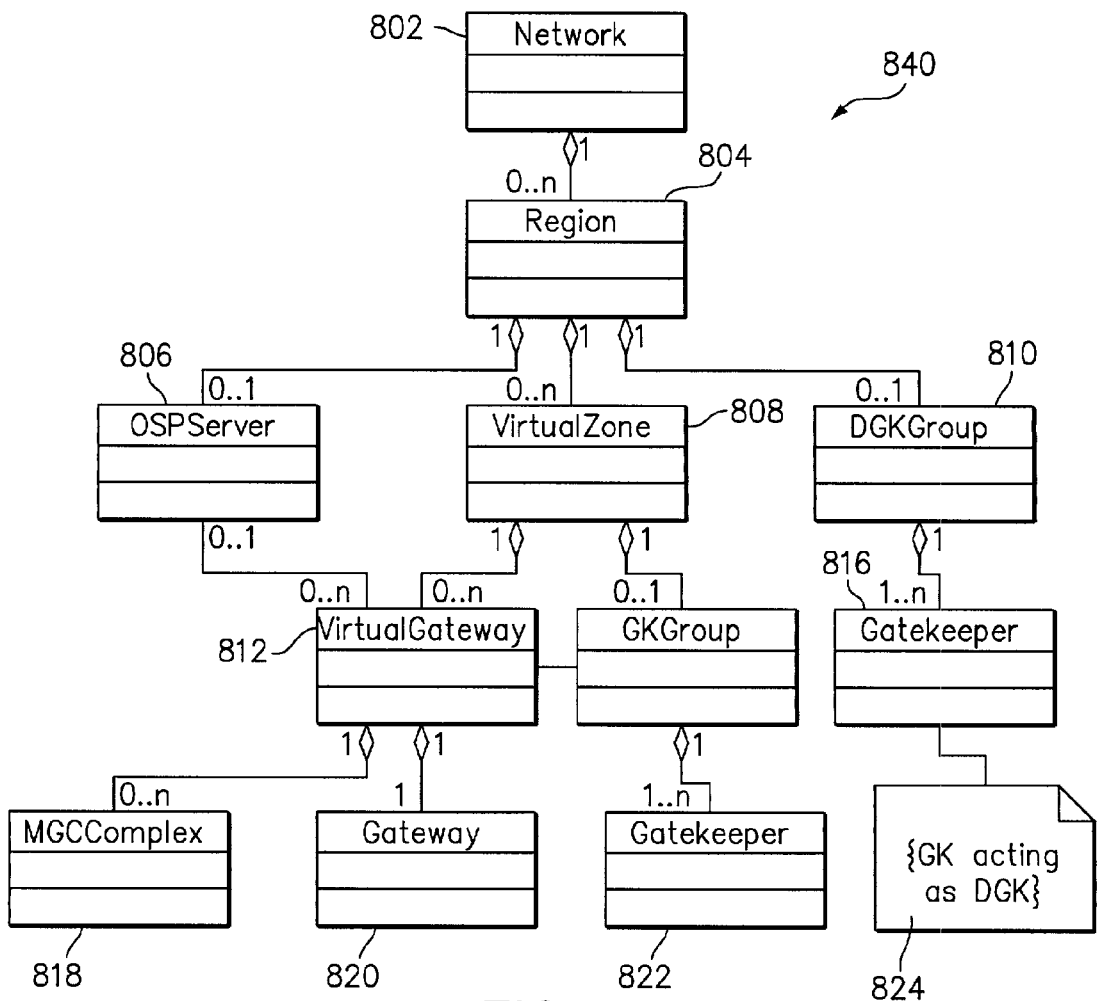
FIG. 8B is a block diagram of illustrating an example of the domain model of FIG. 8A in further detail.

FIG. 8B is a block diagram of illustrating an example of the domain model of FIG. 8A in further detail. Domain model 840 provides an information model for a virtual entity approach for an H.323 network, according to one embodiment. A Network object 802 represents an H.323 network in its entirety, and references zero or more Region object 804. Each Region object 804 represents a geographic or administrative domain, and comprises zero or one Open Settlements Protocol (OSP) Server object 806, zero or more Virtual Zone objects 808, and zero or one Directory Gatekeeper (DGK) Group objects 810. Each DGK Group object represents a group of Gatekeepers that are configured to accept location request (LRQ) forwarding, in which the Gatekeepers are configured solely for the purpose of redundancy through hot standby router protocol (HSRP), and/or serving as alternate DGKs. With a Directory Gatekeeper, individual Gatekeepers do not need to know about other Gatekeepers. Instead, a Gatekeeper consults its routing table, which provides a default route to a Directory Gatekeeper. This Directory Gatekeeper is more knowledgeable about the topology of the network and can forward messages over to the proper egress Gatekeeper. The egress Gatekeeper can then contact the originating Gatekeeper to complete the call setup. OSP servers provide secure settlement transaction functions to support carrier interconnect, in association with a clearinghouse or similar entity.

Each Virtual Zone object 808 represents and contains zero or more Virtual Gateway objects 812 and zero or one Gatekeeper Group objects 814. Each Virtual Gateway object 812 generally represents one Gateway object 820 corresponding to a real H.323 gateway node, but may also represent a SC Complex object 818. Each Gatekeeper Group object 814 represents one or more Gatekeeper objects 822, corresponding to respective real H.323 gatekeeper nodes.

A network management application may interact with H.323 network elements using the foregoing information model. In one embodiment, a network management software element implements management functions that are useful to administrators and other, higher-level management software, in part by manipulating instances of objects of the foregoing information model. An example of such a network management software element is Cisco Packet Telephony Center, from Cisco Systems, Inc. The network management software element can communicate programmatically with higher-level systems by receiving function calls through an application-programming interface (API) that implements an object broker mechanism, such as a CORBA broker.

Figure 9:
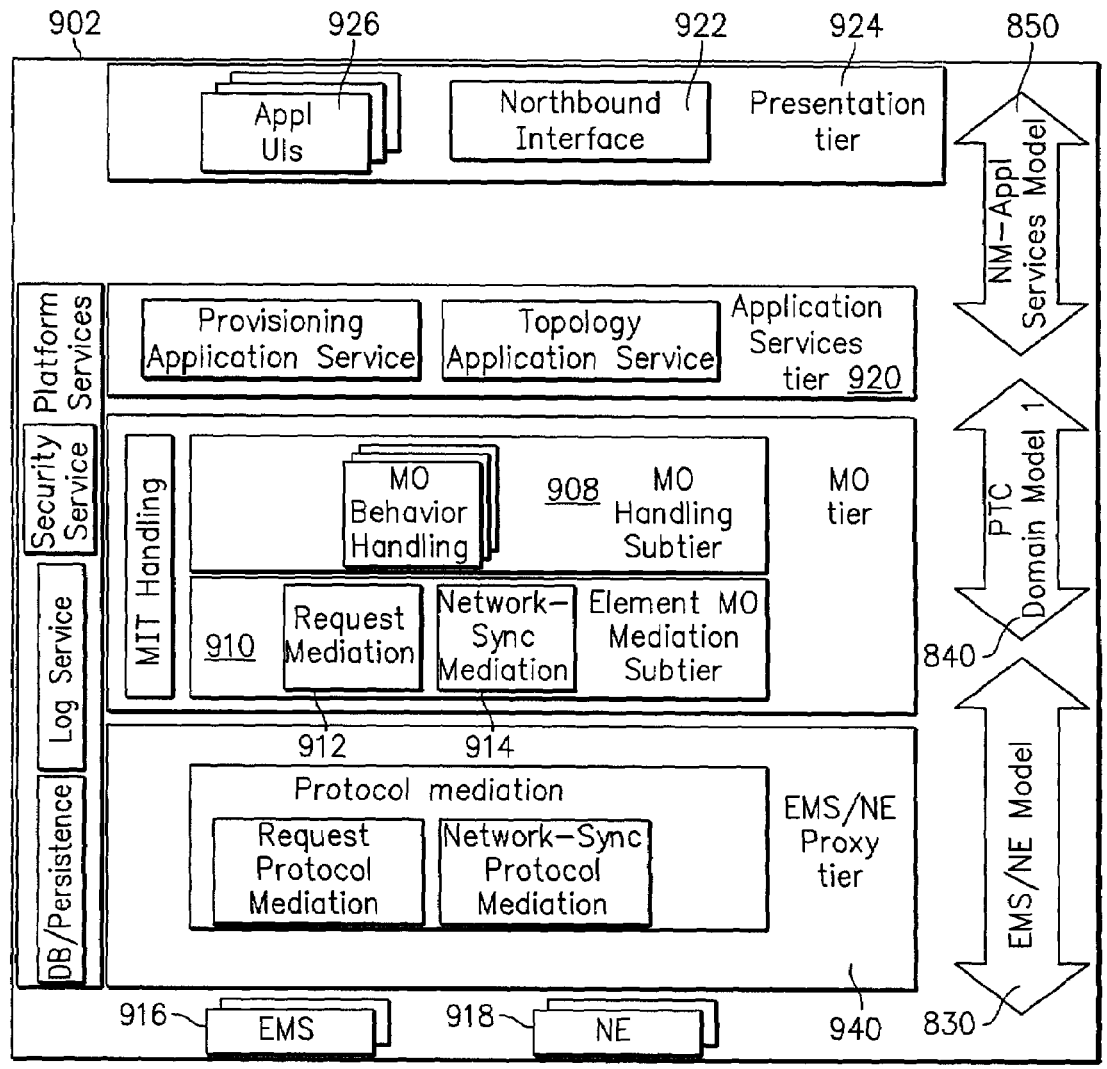
FIG. 9 is a block diagram of an example of software architecture for a network management application that may use the virtual entity approach herein.

FIG. 9 is a block diagram of an example of software architecture for a network management application that may use the virtual entity approach herein.

A network management software application 902 is organized as a plurality of tiers of software elements. An EMS/NE Proxy Tier 904 hides EMS/NE-specific protocol details, such as access details) from the higher-level tiers and mediates protocols of messages exchanged among them. Tier 904 provides facilities by which application 902 accesses individual element management systems 916 or network elements 918. Examples of EMS 916 include Cisco Media Gateway Manager (CMGM), Cisco MGC Node Manager (CMNM), Cisco Universal Gateway Manager (CUGM), etc., and examples of NE 918 include gateways, signaling controllers, switches, routers acting as gatekeepers, etc.

Tier 904 also shields upper tiers from aspects such as having to manage associations with EMS/NEs, as well as protocol specific aspects such as retries, timeouts, retransmission for reliable information, etc. Generally, tier 904 proxies events, such as unsolicited messages from EMS/NEs, operations initiated by application 902, and bulk synchronization requests.

A managed object tier 906 (MO-Tier 906) provides domain model 840. Managed object tier 906 is divided into an MO Model Mediation sub-tier 910 and a MO Handling sub-tier 908. The MO Model Mediation sub-tier 910 mediates between models 840, 830 of FIG. 8A by mapping managed objects in model 830 to corresponding objects in model 840.

Two distinct aspects of such mapping are implemented. A Request Mediator 912 maps request operations initiated by application 902. In this context, "request" refers to a request for carrying out a particular configuration or other operations, for example, translating a set or get operation or an action into a corresponding function provided by the EMS/NE proxy tier 904. Request Mediator 912 provides instance as well as class mappings.

A Network-Sync Mediator 914 provides mappings for bulk synchronization operations, specifically bulk upload of information from EMS 916 or NE 918. For example, Network-Sync Mediator 914 can unpack the bulk information provided, associate it with individual managed object instances in the domain model 840, and provide class level mappings.

The MO Handling sub-tier 908 provides those aspects of the domain model 840 that do not depend on the underlying EMS/NE model 830. Such aspects include all static aspects, as well as dynamic and behavioral aspects not depending on the information model mapping. MO Handling sub-tier 908 also implements a Management Information Tree, which comprises a hierarchical tree of information objects. MO Handling sub-tier 908 provides support for partitioning and distributing the MIT into different MO handlers for performance and scalability reasons.

An NM-Application Services-Tier 920 provides server, non-GUI specific portions of network management application 902, which operate on top of the domain model 840 provided by the MO tier 906. Application services in tier 920 can form a sub-architecture. For example, configuration application services can make use of functions provided by the topology application service (but not necessarily vice versa), etc.

Two mechanisms for accessing the NM-Application Services tier 920 are provided. Applications can access tier 920 using internal interfaces that are optimized for efficiency and that interact with a corresponding interface of the NM application services tier 920. Alternatively, applications can access the tier 920 using northbound interface 922, which provides restricted access to the tier 920 and model 850 over standards-based interfaces, thereby providing the best possible interoperability.

The Northbound interface 922 is offered by a presentation tier 924 that executes logically above tier 920. The Presentation Tier 924 deals with presenting application 902 and data relating to other tiers to outside users. For example, Presentation Tier 924 comprises one or more application user interfaces 926, which encompass both client and server portions. That is, UI components in presentation tier 924 may be distributed, and the presentation tier is not restricted to client user interfaces only.

Northbound interface 922 provides electronic interfaces for northbound operational support systems (OSSs), providing a mechanism that enables OSSs to access the NM application services model 850 through an open management interface.

C. Detailed Description of Information Model

A plurality of object views are now introduced as a means to break up specification of the domain model, and focus on specific aspects of the model. The same object can occur in more than one view. Likewise, within a view, not all aspects of an object and relationships with other objects are depicted. A composition into different views is possible, as are other ways to organize the presentation of the model. In this context, the terms "object" and "managed object class" are used interchangeably. In addition, the term "object" refers to a managed object class, and not an object instance. Objects in the views described herein correspond to entities of relevance to a user and to an application operating on top of application 902.

In one embodiment, the object views comprise the following views:

H.323 Voice Network view. Contains the voice network view of the H.323 network devices. A H.323 voice network is partitioned into regions, with each region consisting of a DGK Group, and a set of virtual zones. Each virtual zone contains a list of voice gateways, the SS7 signaling controllers, and a GK Group which functions as the address resolution authority for all the gateways within the zone.

Virtual Gateway views. Anything involving the virtual gateway in its entirety, as opposed to centering of any of its components. The following sub-views apply:

1. Virtual Gateway—network view. Contains the view of the virtual gateway as a network, with its nodes (i.e. Gateway and Signaling Controller) and connections (i.e. association between GW and SC).

2. Virtual Gateway—signal path association view. Essentially a refinement of the network view, expanding on the composition of the signaling association between MG and MGC.

3. Virtual Gateway—voice port view. Essentially a refinement of the connection termination point view, this view deals with the composition of a trunk and its mapping into lines and ports of its component as well as the information required to control it.

Signaling Controller views. Anything centering on the Signaling Controller. While the objects of this view really are part of the EMS/NE, they constitute the SC's abstraction as required and appropriate for application 902. The following sub-views apply:

1. Signaling controller—connection termination point view. Offers a view of the Signaling Controller in terms of termination points. There are two aspects: actual termination points, specifically for signaling and for internal associations between it and the GW, and knowledge of termination points of the GW which is required to control them.

2. Signaling controller—equipment view. Offers a view of the SC's physical instantiation. Clearly, in the case of the SC2200 complex, it is composed of several pieces of equipment that are networked together.

Router views. Anything centering on the Router. While the objects of this view really are part of the EMS/NE, they constitute the router's abstraction as required and appropriate for application 902. The following sub-views apply:

1. Router—connection termination point view. Offers a view of the Media Gateway in terms of the protocol access points it offers, as well as the lines respectively ports used to connect the router on the switching/TDM plane.

2. Router—equipment view. Offers a view of the Router in terms of its physical instantiation. This is relevant to application 902 mostly to be able to correlate other objects maintained by application 902 to the physical world; details of the equipment view will generally correspond to genuine element functionality.

Media gateway views. Anything centering on the Media Gateway. While the objects of this view really are part of the EMS/NE, they constitute the media gateway's abstraction as required and appropriate for application. The following sub-views apply:

1. Media gateway—connection termination point view. Offers a view of the GW in terms of the termination points it offers to terminate internal associations between it and the SC, and in terms of the voice service access points that connect to the lines respectively ports contained under the router.

2. Media gateway—router association view. A Media Gateway really constitutes a role that a router plays in an OPT network. This view depicts the relationship between the Media Gateway and the router on which the GW is realized. It "ties up" the logical voice entities that constitute a GW with the device entities that form a router. For example, it depicts the association between the GW and the network interface on which the H.323 protocol has been configured; it shows the association between the voice port and the DS1 line on which Ds0s belong; it relates the Q.931 TTP to the D-Channel TTPs on which the NFAS Group is supported.

Gatekeeper views. Anything centering on the Gatekeeper. While the objects of this view really are part of the EMS/NE, they constitute the GK's abstraction as required and appropriate for application 902. The following sub-views apply:

1. Gatekeeper—connection termination point view. Offers a view of the Gatekeeper in terms of the termination points it offers.

2. Gatekeeper—router association view. Offers a view of the association between the GK and the router that realizes it.

FIG. 8B, also described above, is a block diagram of an H.323 voice network view.

Figure 11A:
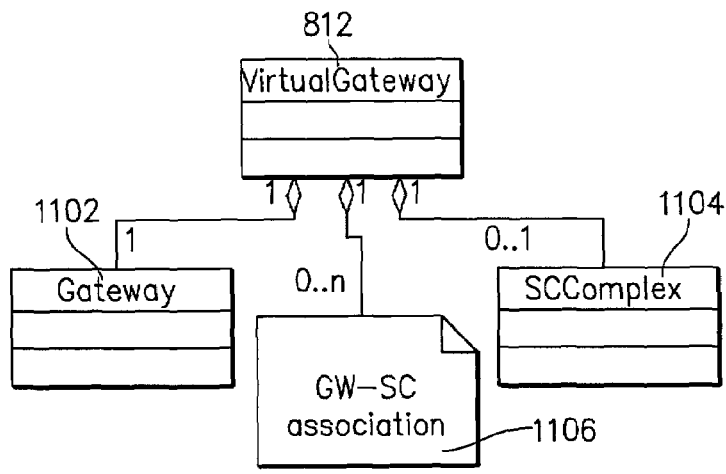
FIG. 11A is a block diagram of a network view of a virtual gateway.

FIG. 11A is a block diagram of a network view of a virtual gateway. A Virtual Gateway 812 consists of a voice gateway 1102, zero or one Signaling Controller complexes 1104, and zero or more GW-SC associations 1106 that pertain to the virtual gateway's SCs and GW. The GW-SC associations 1106 provide the internal connectivity of the virtual gateway. The virtual gateway 812 contains every association of the SC with the GW. In the context of a global long distance voice solution, a SC can be associated with more than one GW, in which case the SC is part of more than one virtual gateway.

Figure 11B:
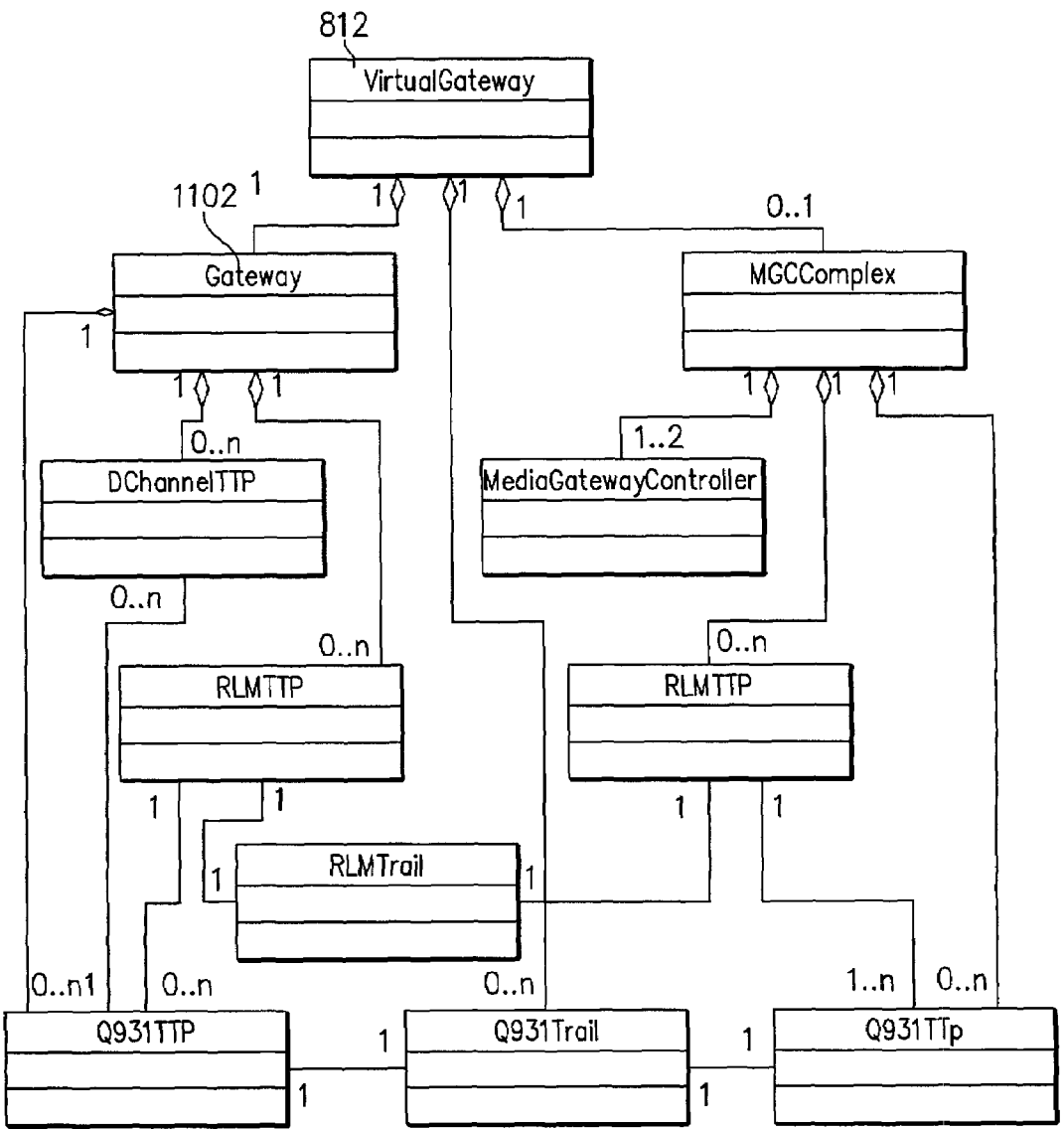
FIG. 11B is a block diagram of a Q.931 signal path view of a virtual gateway.

FIG. 11B is a block diagram of a Q.931 signal path view of a virtual gateway. As noted above for FIG. 11A, connectivity between SC and GW is represented by GW-SC associations 1106. Each such association represents a Q.931 Signal Path. Q.931 signaling occurs via a Redundant Link Manager (RLM) Group, which may contain one or more Redundant Link Managers, each of which contains one or more RUDP sessions. The Q.931 backhaul occurs over IP and eventually over a physical connection. In the context of a global long distance voice solution, the physical connection is between a port on the LAN Switch of the SC complex, and a port on the Gateway.

Figure 12A:
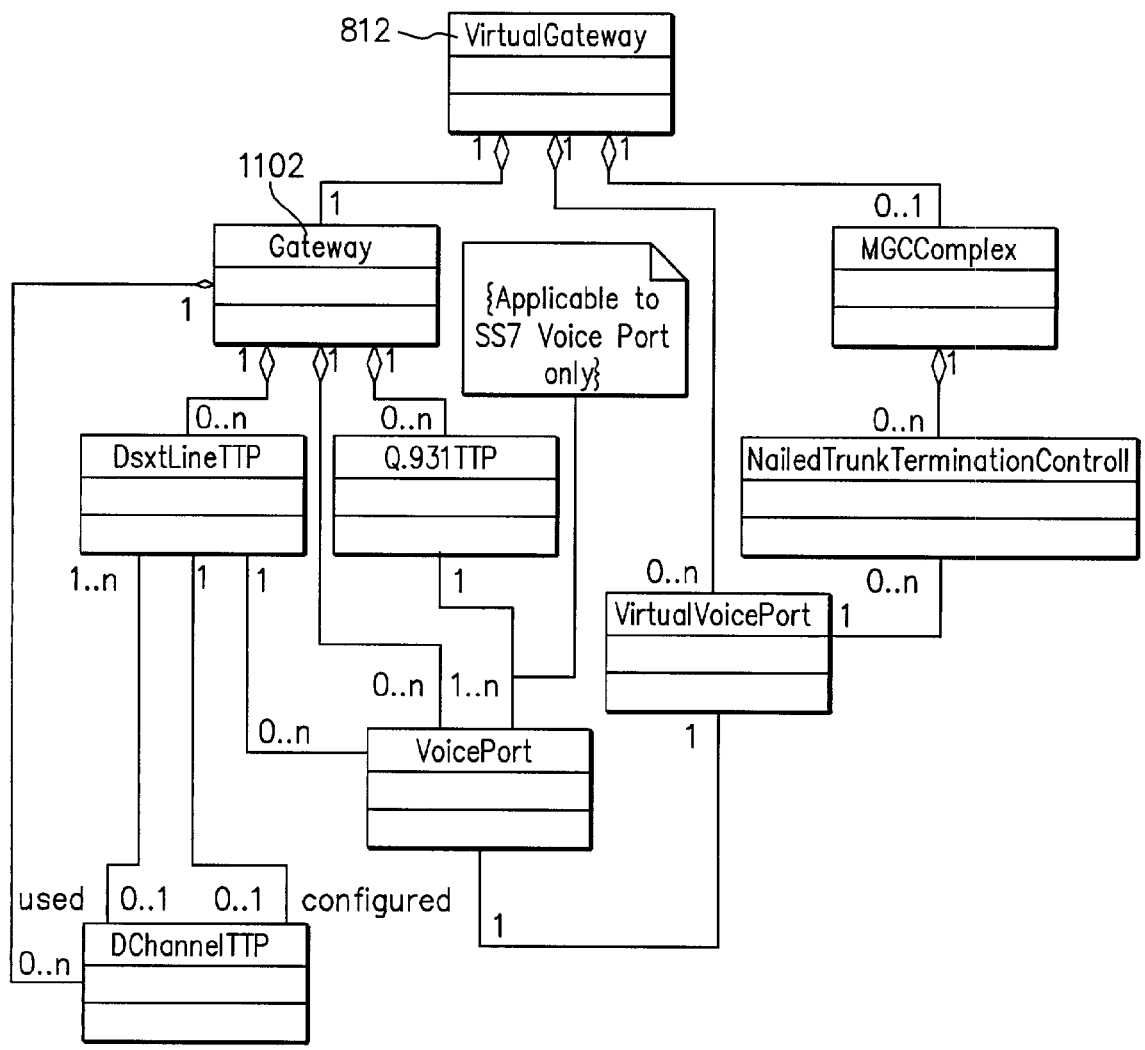
FIG. 12A is a block diagram of a voice port view of a virtual gateway.

FIG. 12A is a block diagram of a voice port view of a virtual gateway. A voice port corresponds to a grouping of Ds0s as provided by a DS3 or DS1 line in a GW, which are configured to convey signaling information in a manner that is compatible with the circuit-switched network. In addition to the Ds0s, which are provided by the MG, for the voice port to be "complete" and usable, the SC must also be aware of the Ds0s and be able to carry out the CIC to Ds0 mapping, which are encompassed in the voice port object.

Figure 12B:
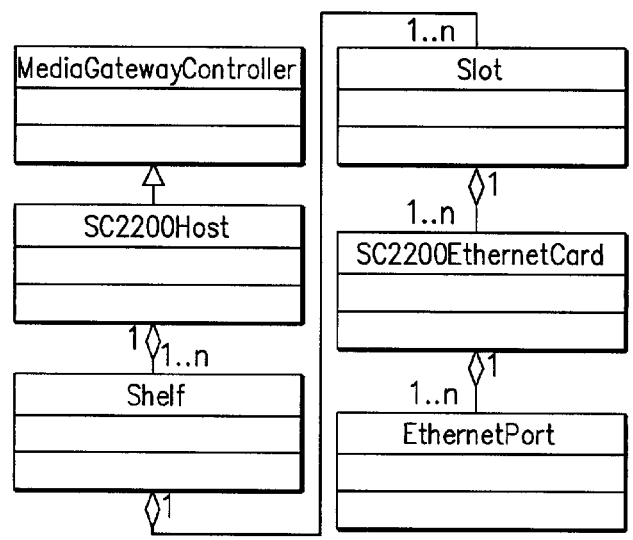
FIG. 12B is a block diagram of an equipment view of a signaling controller.

FIG. 12B is a block diagram of an equipment view of a signaling controller.

Figure 12C:
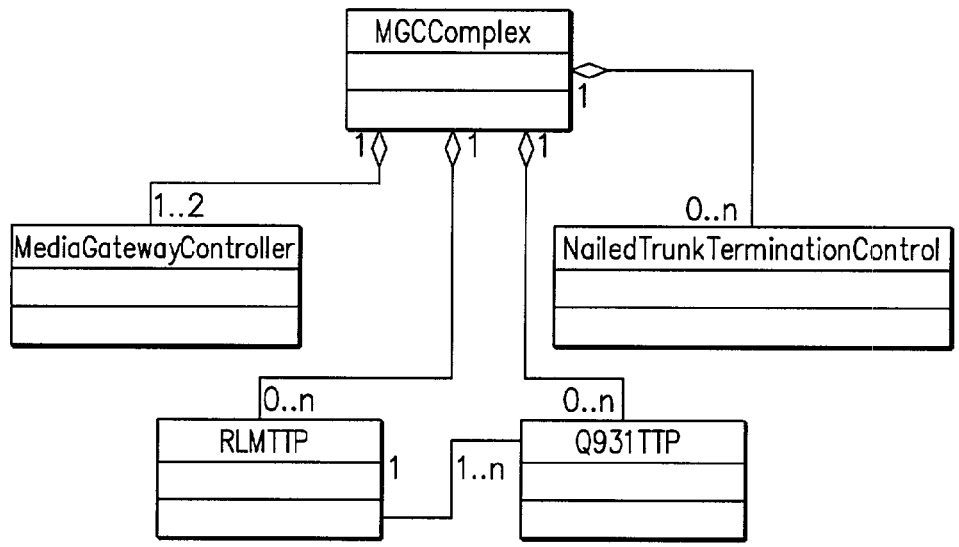
FIG. 12C is a block diagram of a connection termination point view of a signaling controller.

FIG. 12C is a block diagram of a connection termination point view of a signaling controller.

Figure 12D:
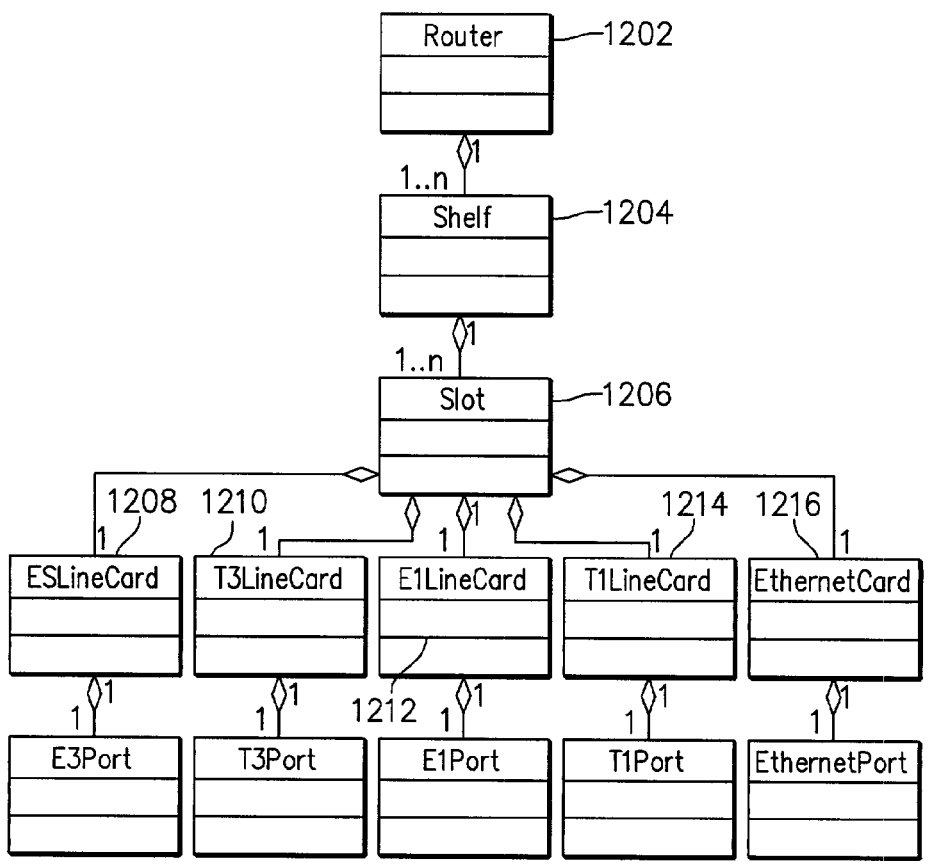
FIG. 12D is a block diagram of an equipment view of a router.

FIG. 12D is a block diagram of an equipment view of a router. A router object 1202 represents the router as a whole, and contains one or more shelves, each represented by a shelf object 1204. One or more slot objects 1206 are contained within each shelf object 1204. The slot objects comprise an E3 line card object 1208, T3 line card object 1210, E1 line card object 1212, a T1 line card object 1214, or an Ethernet line card object 1216. Each line card object contains a corresponding port object. Each specific type of router may impose additional constraints on the number and types of cards it can host and the ports it contains, and the object model is modified accordingly.

Figure 12E:
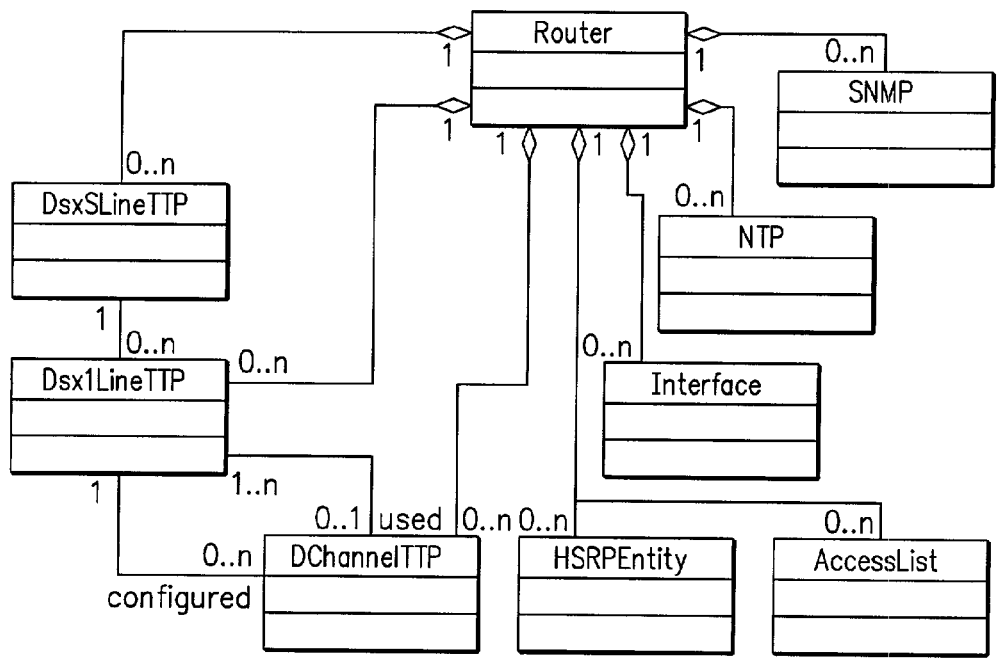
FIG. 12E is a block diagram of a connection termination point view of a router.

FIG. 12E is a block diagram of a connection termination point view of a router.

Figure 12F:
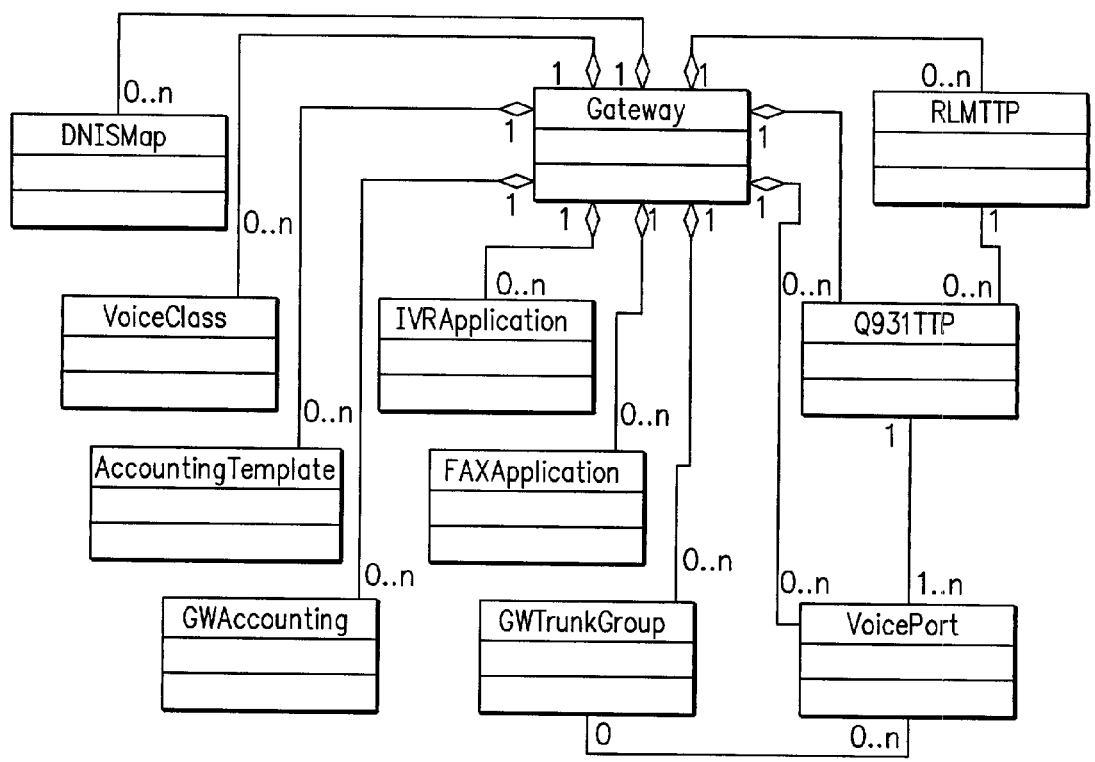
FIG. 12F is a block diagram of a connection termination point view of a gateway.

FIG. 12F is a block diagram of a connection termination point view of a gateway.

FIG. 13A is a block diagram of a router association view of a gateway.

FIG. 13B is a block diagram of a connection termination point view of a gateway.

FIG. 13C is a block diagram of a router termination point view of a gateway.

The configuration parameters described herein are provided as non-limiting examples, and many other combinations of configuration parameters may be used. For example, certain parameters may apply to certain devices, whereas other parameters would be appropriate for other devices. Additional details concerning one example implementation of the foregoing object model are provided in APPENDIX A, INFORMATION MODEL, which provides class descriptions, inheritance diagrams, an object specification, and a data type specification for a complete object model.

D. Configuration Operations

Network management application 902 may implement five functional areas including fault management, configuration management, accounting management, performance management, and security management. For purposes of illustrating a simple example, this description focuses on use of network management application 902 and domain model 840 for configuration management.

In one embodiment, configuration management functions of application 902 include topology functions, provisioning functions, security management functions, and northbound API functions. Topology functions include discovery of network element physical and logical configurations; discovery of network layer concepts such as virtual zone, virtual gateway, GK group, DGK group, Q931 signal path, voice port; periodic and on-demand synchronization with network elements; flagging of network mis-configuration and policy violations; integrated network topology views, such as H.323 network view, EMSs view; introduction and removal of region, gatekeepers, gateways, and other elements; providing a single point of management entry, to enable an operator to launch other management applications; and synchronizing topological changes between applications.

Provisioning functions may include region configuration, virtual zone configuration, virtual gateway configuration, and configuration of gatekeepers and directory gatekeepers. Region configuration functions may include: Deploy SMNP; Deploy NTP; Configure RADIUS related parameters; Configure Accounting Template; Configure AAA Voice Class; Configure Gateway Accounting; Virtual Zone Configuration; Configure H.235 Security options; Configure SNMP; Configure NTP; Configure RADIUS related parameters; Configure Accounting Template; Configure AAA Voice Class; Configure Gateway Accounting; and Configure OSP related parameters.

Virtual Gateway configuration functions may include: Configure Q.931/RLM Signal Path, including GTD parameters; Configure Voice Port, including Digital Voice Port for SS7, ISDN-PRI, T1 CAS, E1 R2 signaling, and Analog Voice Port for E&M, FXS, FXO signaling; Configure IVR & VoiceXML; Configure DNIS Map; Configure SNMP; Configure NTP; Configure RADIUS related parameters; Configure Accounting Template; Configure AAA Voice Class; Configure Gateway Accounting; Configure OSP related parameters; Configure Access List; Configure Ethernet Interface; Configure T.37/T.38 FAX Application; Configure H.323 parameters; Configure BRQ Message Forwarding; Configure ISUP Parameter Forwarding; and Configure Trunk Group.

Gatekeeper/Directory Gatekeeper configuration functions may include: Configure HSRP; Configure SNMP; Configure NTP; Configure RADIUS related parameters; Configure Access List; and Configure Ethernet Interface.

Security Management functions may include user authentication and authorization, user management (add, modify and delete user); and Audit Trail functions.

Northbound API functions may include user authentication and authorization, and network inventory bulk retrieval.

E. Voice Port Configuration

Voice port configuration is now described, as an example of configuration operations that may be performed by application 902 using model 840. In this description, voice port configuration refers to configuring a virtual voice port on a virtual gateway. For a non-SS7 voice port, this operation involves voice port configuration on the gateway; for an SS7 voice port, the voice port configuration operation involves creation of a digital SS7 voice port on the gateway, and creating a corresponding nailed trunk on the respective signaling controller. For the voice port to be fully functional, a Q.931 signal path is established between the signaling controller and gateway.

Voice ports are found at the intersections of packet-based networks and traditional telephony networks, and they facilitate passing voice and call signals between the two networks. Physically, voice ports connect an access server to a line from a circuit-switched telephony device in a PBX or the public switched telephone network (PSTN).

The devices in the packet network are configured to convey signaling information in a way that the circuit-switched network can understand. They also are required to understand signaling information received from the circuit-switched network. This is accomplished by installing appropriate voice hardware in the access, server and by configuring the voice ports that connect to telephony devices or the circuit-switched network.

The voice connections can be either analog or digital. Respective operations for configuring analog and digital voice ports are now described.

1. Configure Analog Voice Port for E&M, FXS, FXO Signaling

The signaling types on an analog voice port can be E&M, FXS, or FXO signaling. E&M signaling is the most common form of analog trunk circuit. An E&M interface uses special signaling paths that are separate from the trunk's audio path to convey information about the calls. Like a serial port, an E&M interface has a data terminal equipment/data communications equipment (DTE/DCE) reference. In terms of telecommunications, the trunking side is similar to the DCE, and is usually associated with central office (CO) functionality. The router acts as the DCE or trunking side of the interface. The other side is referred to as the signaling side, like a DTE, and is usually a device such as a PBX; it is an analog connection although an analog E&M circuit may be emulated on a digital line.

In FXS Signaling, an FXS interface connects a router or access server to end-user equipment such as telephones, fax machines, or modems. The FXS interface supplies ring, voltage, and dial tone to the station and includes an RJ-11 connector for basic telephone equipment, keysets, and PBXs.

In FXO signaling, an FXO interface is used for trunk, or tie line, connections to a PSTN CO or to a PBX that does not support E&M signaling (when local telecommunications authority permits). This interface is primarily used for off-premise station applications. A standard RJ-11 modular telephone cable connects the FXO voice interface card to the PSTN or PBX through a telephone wall outlet. FXO and FXS interfaces indicate on-hook or off-hook status and the seizure of telephone lines by one of two access signaling methods: loop start or ground start.

The configurable parameters on an analog voice port are:

For E&M Signaling: Type of Signaling (either wink-start or immediate-start or delay-dial); CPTone; the number of wires used for voice transmission; type of E&M Interface (one of Type-I, Type-II, Type-III, Type-IV); and Voice Port Description.

For FXS Signaling: Type of Signaling (either loop-start or ground-start); CPTone; Ring Frequency; Ring Pattern; and Voice Port Description.

For FXO Signaling: Type of Signaling (either loop-start or ground-start); CPTone; Dial Type (DTMF or Pulse); Ring Number; and Voice Port Description.

2. Configure Digital Voice Port for SS7, Isdn-PRI, T1 CAS, E1 R2 Signaling

Digital voice ports are found at the intersection of a packet voice network and a digital, circuit-switched telephone network. The digital voice port interfaces that connect the access server to T1 or E1 lines pass voice data and signaling between the packet network and the circuit-switched network.

The T1 or E1 lines that connect a telephony network to the digital voice ports on an access server contain channels for voice calls; a T1 line contains 24 full-duplex channels or "timeslots," and an E1 line contains 30. The signal on each channel is transmitted at 64 kbps, a standard known as digital signal 0 (DS0); the channels are known as DS0 channels. Some or all of the DS0 channels are grouped into a DS0 Group (or a logical voice port) facilitating similar configuration of all the DS0 Channels in a group.

Signaling on digital lines has two aspects. A first aspect is the actual information about line and device states that is transmitted, and the second aspect is the method used to transmit the information on the digital lines. The actual information about line and device states is communicated over digital lines using signaling methods that emulate the methods used in analog circuit-switched networks (FXS, FXO, and E&M). The method used to transmit the information describes the way that the emulated analog signaling is transmitted over digital lines, which may be common-channel signaling (CCS) or channel-associated signaling (CAS). CCS sends signaling information on a dedicated channel and CAS takes place within the voice channel itself. CAS signaling is also called robbed-bit signaling because user bandwidth is robbed by the network for signaling. A bit is taken from every sixth frame of voice data to communicate on- or off-hook status, wink, ground start, dialed digits, and other information about the call.

Adding a digital voice port on a gateway, involves the following operations. First, controller settings are configured. Specific line characteristics are configured to match those of the PSTN line that is being connected to the voice port. These are typically configured in controller configuration mode. Voice port controller configuration includes first specifying framing formats, clock sources, and line coding, and then creating a group of DS0 timeslots, that can be either a DS0 Group or PRI Group based on the signaling method used. If a DS0 Group is created, it defines the DS0 channels for E1 R2 signaling, and the emulated analog signaling method (E&M or FXO or FXS) that the router uses to connect to the PBX or PSTN. If a PRI Group is created, it defines the DS0 channels for ISDN or SS7 signaling. Thereafter, the controller is activated.

A logical voice port is then created and associated it to the DS0 Group, PRI Group or CAS Group.

For SS7 signaling, the serial interface corresponding to the D-Channel is configured, by specifying the parameters such as RLM group number, ISDN switch type, protocol emulation type, incoming voice type, CDP, fair queuing.

Basic voice port parameters are then configured. The voice port configuration mode allows many of the basic voice call attributes to be configured to match those of the PSTN or PBX connection being made on this voice port. Normally, default parameter values for voice ports are sufficient for most networks. Depending on the specifics of a particular network, however, certain parameters that are configured on voice ports may require adjustment. These parameters include: Auto Cut-Through, which enables the system to connect to PBXs that do not provide an M-lead response; Sent/Received Bit Patterns; disconnect supervision parameters, which are used to indicate different methods to indicate that a call disconnection; FXO Supervisory Disconnect Tone parameters; voice call progress tone; companding standard; timeouts parameters; timing parameters; Voice Quality Tuning parameters, e.g. echo; and Voice Activity Detection (VAD) parameters.

Figure 14:
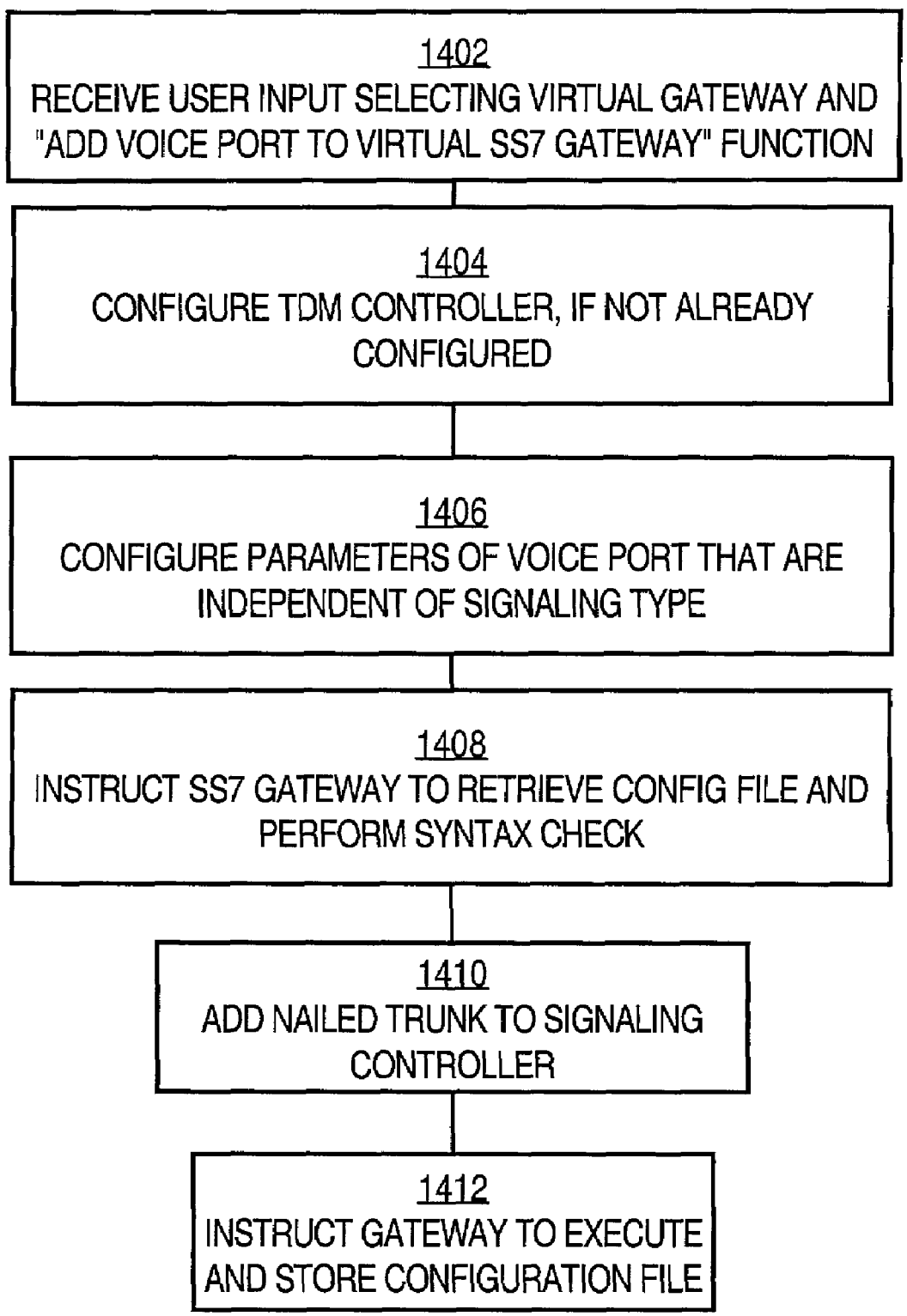
FIG. 14 is a flow diagram illustrating an example of a process for adding a voice port to an SS7 gateway in an SS7 point of presence (POP), according to one embodiment.

FIG. 14 is a flow diagram illustrating an example of a process for adding a voice port to a virtual SS7 gateway in an SS7 point of presence (POP), according to one embodiment. It is assumed that the identity of the user is properly authenticated, that the user is authorized to perform this operation, that initial device discovery has been performed, and an RLM Signaling Path between the Gateway and the signaling controller is configured.

1. User input selecting a virtual gateway and an "Add Voice Port to Virtual SS7 Gateway" function is received, as shown in block 1402. In one embodiment, the user invokes an Add Voice Port operation in application 902, and specifies the Gateway, signaling controller and all the parameters required to configure voice port. Alternatively, a virtual gateway is specified.

2. Application 902 translates the invocation into operations on the Gateway as well as the signaling controller, as follows.

3. Application 902 initiates the following operations on the Gateway:

a. Configure the TDM controller (T1/E1 or T3), if it is not already configured, as shown in block 1404 of FIG. 14.

b. For the T3 controller: Configure the parameters such as cable length, framing type, and description. Also, create 28 logical T1 controllers from the T3 Controller. Each T1 can be configured independently.

c. For the T1/E1 controller, configure the parameters such as framing, clock source, and line coding.

d. For NFAS, create a PRI-Group using the specified timeslots on the TDM Controller, the operation of the D-Channel time-slot (primary|backup|none), NFAS interface value (0-8), and NFAS Group number.

e. Activate the controller.

f. Identify the Voice Port.

g. Parameter values for parameters of the voice port that are independent of the type of signaling are configured, as indicated in block 1406. In one embodiment, such parameters may include: voice call progress tone; companding standard; timeouts (call-disconnect timeout, inter-digit timeout, ringing timeout, wait-release timeout); timing parameters (clearwait, delay-duration, delay-start, dial-pulse min-delay, digit, guard-out, hook flash-out, inter-digit, pulse, pulse-digit, pulse-inter-digit, wink-duration, wink-wait); VAD parameters (music-threshold, comfort-noise); voice quality tuning parameters (jitter, echo-cancel, input gain, output attenuation, impedance); and FXS Hook flash Relay.

h. For NFAS configuration, also configure the serial interface corresponding to the D-Channel, by specifying the parameters such as RLM Group number, ISDN switch type (should always be "primary-ni"), protocol emulation type, incoming voice type, CDP, fair queuing.

4. In block 1408, the gateway is instructed to retrieve a configuration file containing the foregoing configuration instructions, and perform a syntax check on it. In one embodiment, application 902 generates an event, informing the Gateway to retrieve the configuration file and perform a syntax check, without writing the configuration into the Gateway's startup or running configuration, for all the commands in the configuration file.

5. After the Gateway has executed all the commands in the configuration file, generate an event indicating success or failure of the commands executed by the Gateway.

6. In block 1410, a nailed trunk is added to the signaling controller. In one embodiment, if Application 902 receives an event signifying the success of the operation on the Gateway, then the application issues a request to the signaling controller to add a nailed trunk. In issuing such request, application 902 provides parameter values that indicate the NasPath between the signaling controller and the Gateway, the timeslot/channel on the Gateway, the NFAS interface on the Gateway, and the SS7 Path.

7. If the operation on the signaling controller succeeds, then trigger an event, thereby informing the Gateway to get the configuration file and execute all the commands in the configuration file, and persistently store the configuration into the startup configuration of the Gateway, as in block 1412.

8. After the Gateway has executed all the commands in the configuration file, an event indicating success or failure of the commands executed by the Gateway is generated.

9. If Application 902 receives an event signifying the success of the operation on the Gateway, then Application 902 updates its internal object tree. If the operation on the signaling controller fails, then a request to cancel the previous request to add the Voice Port on the Gateway is generated.

10. The operation is logged in the name of the requesting user in a database.

In all of the foregoing, references to performing configuration options are intended to refer broadly to both programmatically triggering a configuration operation on a programmatic object representing a virtual entity, and then as part of that operation, causing actual management operations to be performed with the underlying actual device. The way that a particular management operation is performed may vary from device to device and may include, for example, preparation of a configuration file, delivery of the configuration file, and generating an event at the device to indicate successful delivery. Alternatively, management operation could be sent, using an appropriate management protocol, to a device and a response could be received from the device. In yet another alternative, an asynchronous or synchronous operation may be invoked on an element of a management system acting as a communication proxy on behalf of application 902.

The foregoing is only one example of a provisioning operation that can be carried out using the virtual entity approach described herein. Other examples are provided in APPENDIX B, entitled "USE CASES."

F. Inconsistency Flagging

Programmatic objects in the domain model may automatically carry out inconsistency checking. For example, if a user attempts to add a voice port to a virtual entity, but no corresponding link previously was set up, appropriate objects of application 902 may automatically trap and report this inconsistency before attempting to actually add the requested voice port to physical devices constituent to the virtual entity. Similarly, if a user attempts to delete a voice port and a physical device is then-currently using a signaling link associated with the voice port, application 902 blocks deletion of the port until the user removes or de-activates the associated link.

In one embodiment, inconsistency checking is carried out by application 902 based on information that is gathered from the network in the course of performing discovery of devices that exist in the network. Inconsistency flagging may comprise region validation, directory gatekeeper group validation, gatekeeper group validation, virtual gateway validation, and virtual zone validation. In region validation, application 902 detects inconsistent inter-region configurations. Any inconsistency detected is marked in the respective region and DGK/GK objects.

In one operation, application 902 detects mis-configuration among DGKs associated with a first Hierarchy Region and a second Hierarchy Region. The DGKs in two different hierarchical regions must be configured to point to each other as remote DGKs for each other. With respect to a Hierarchy Region and a Meshed Region, application 902 will detect mis-configuration between the DGKs in the hierarchy region, and the GKs in the meshed region. The DGK in the hierarchy region must point to each GK in the meshed region as remote GK. The GKs in each zone of the meshed region must point to the DGK as remote GK. With respect to a first Meshed Region and a second Meshed Region, application 902 will detect mis-configuration among the GKs between the two regions. The GKs in each zone of a first region must point to GKs in each zone of the other region as remote GK, and vice versa.

Application 902 detects other intra-region inconsistent configurations. Any inconsistency detected is marked in the respective region and DGK/GK objects. For example, with respect to a Hierarchy Region, application 902 will detect mis-configuration between the DGK Group and the zones. Each DGK must be configured to point to each GK in each zone as remote GK, and vice versa. For a Meshed Region, application 902 will detect mis-configuration between zones. Each GK in each zone must be configured to point to each GK in the other zones as remote GK.

In another operation, application 902 performs DGK Group validation. Application 902 will validate that all DGKs contained in the DGK group are configured solely for the purpose of redundancy through HSRP and/or serving as alternate DGKs. The validation will be done by cross-referencing the HSRP & cluster IOS configurations among the DGKs. Any inconsistency detected will be marked in respective DGK Group object.

In yet another operation, application 902 performs GK Group validation. Application 902 will validate that all GKs contained in the GK group are configured solely for the purpose of redundancy through HSRP, clustering and/or serving as alternate GKs. The validation will be done by cross-referencing the HSRP & cluster IOS configurations among the GKs. Any inconsistency detected will be marked in the respective GK Group object.

Still another operation involves Virtual Gateway validation. Application 902 validates the configuration between the GW and SC on a SS7 virtual gateway. Any inconsistency detected will be marked in the respective virtual gateway and GW/SC objects. Such checking includes testing for consistent redundant link managers; consistent Q.931 signal paths; and consistent trunk termination. In consistent redundant link manager (RLM) checking, GW RLM group configurations must be consistent with the SC NAS Path IP links. In consistent Q.931 signal path checking, the GW SS7 serial interface configurations must be consistent with the SC NAS Path configurations. In consistent trunk termination checking, the SC nailed trunk configurations must be consistent with the GW PRI group configurations Application 902 also performs virtual zone validation. Application 902 will validate consistency between the GW dial peer configurations and the GK zone configurations. Any inconsistency detected will be marked in the respective virtual zone and GK/GW objects. The checking will include verifying that the GK ID configured on the GW matches the GK ID in the GK configuration.

F. Graphical User Interfaces

Figure 10A:
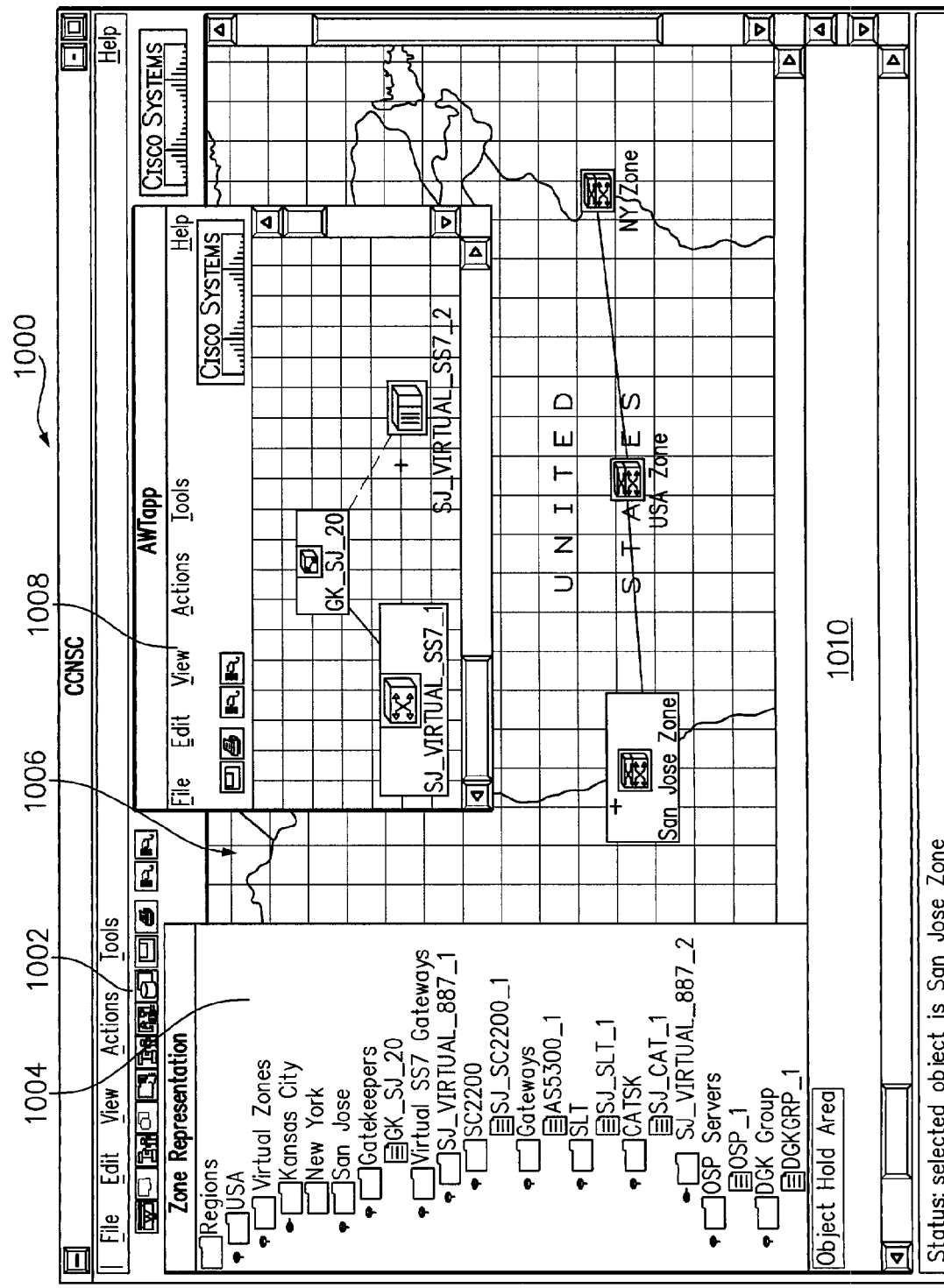
FIG. 10A is a screen display diagram that illustrates a graphical user interface providing a topology display of an H.323 network based on the virtual entity approach described herein.

FIG. 10A is a screen display diagram that illustrates a graphical user interface providing a topology display of an H.323 network based on the virtual entity approach described herein. In one embodiment, topology display 1000 of FIG. 10A is initially displayed by application 902 when it starts operation, and provides an entry point for all other system functions.

In general, topology display 1000 comprises a toolbar 1002, a zone tree panel 1004, a geographical view 1006, and an object hold area 1010. Zone tree panel 1004 provides a hierarchical tree view of network objects under management by application 902. Network objects shown in zone tree panel 1004 are displayed according to a logical containment hierarchy of the objects. A user may selectively display lower level objects by double clicking on any tree item.

The geographical view 1006 provides a geographical map that includes one or more icons corresponding to physical or virtual entities, and showing the physical location of the network elements with respect to a particular geographic region. Topology display 1000 can selectively generate one or more component views 1008 to show the network elements contained within an object shown in topology panel 1006. For example, component view 1008 can display a signaling controller and gateway that are contained within a selected virtual gateway; or the gatekeeper group and virtual gateways of a selected virtual zone.

In the example of FIG. 10A, topology display 1006 depicts a United States geographical region showing three zones: Kansas City, New York and San Jose. Component panel 1008 displays elements contained within the selected San Jose zone, including a gatekeeper and two virtual gateways.

In one embodiment, the topology display is divided into a plurality of logical views, including an H.323 network view and a management view. The H.323 network view shows elements of the network, regions, virtual zones, DGK groups, GK groups, virtual gateways, media gateways and signaling controllers. The management system view shows all element management systems and appliances to which application 902 interfaces.

Toolbar 1002 serves as a launch point for functions internal to application 902, such as Provisioning GUI, Log Viewer, User Manager, etc., or for external applications. From topology display 1000, a user can initiate forced synchronization with the entire network, or partial network (such as a region, a virtual zone, or virtual gateway). The user can add or delete a managed resource such as region, signaling controller, gateway, gatekeeper, and directory gatekeeper.

Any inconsistent network configurations are detected and flagged in the topology display 1006. A mis-configured managed entity is highlighted in color; these entities may include a GK Group, DGK Group, virtual gateway, or virtual zone. The user will be able to select any mis-configured entity and review a detailed description of the inconsistent configurations. Unreachable devices and management systems are also highlighted in well-defined color in the Topology display.

Figure 10B:
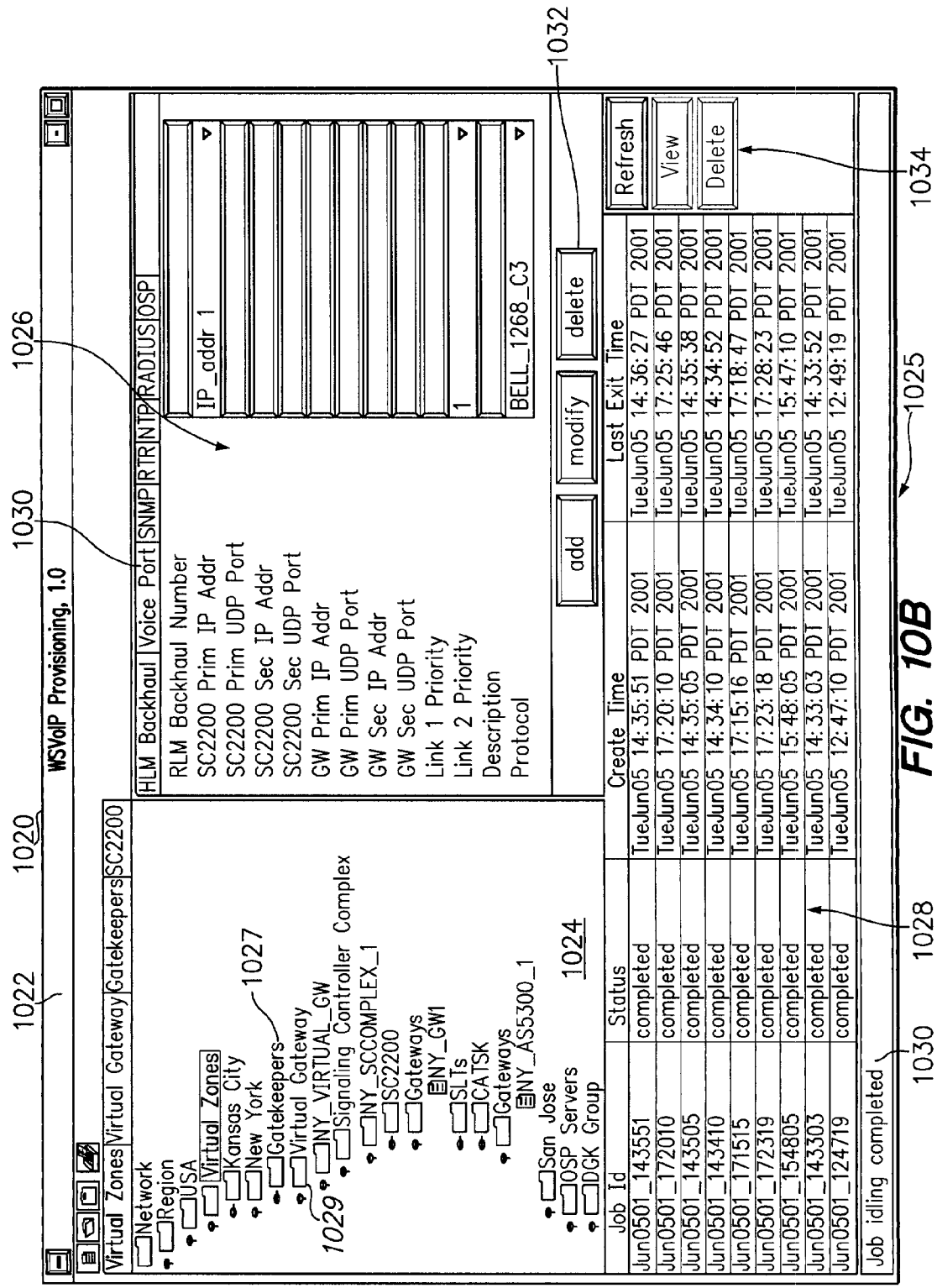
FIG. 10B is a screen display diagram that illustrates a graphical user interface for accessing provisioning functions of the application of FIG. 9.

FIG. 10B is a screen display diagram that illustrates a graphical user interface for accessing provisioning functions of the application of FIG. 9. In one embodiment, the provisioning GUI is implemented as a Java program, and may be invoked from a menu item in the topology GUI of FIG. 10A.

In the embodiment of FIG. 10B, a provisioning GUI screen 1020 is divided into four panels 1022, 1024, 1026, 1025. A top panel 1022 is a menu panel that provides one or more drop-down menu for program functions. A middle left panel 1024 provides a network tree display 1027 used for object browsing and object selection. A middle right panel 1026 is the main configuration area for the user to provision services. Objects 1029 to be provisioned are selected from the network tree display 1027 in the left panel 1024, dragged and dropped into middle right panel 1026. The user selects the type of service to provision, the parameters to configure, and the operation (add/modify/delete) to apply using tabs 1030 and function buttons 1032, respectively. In the example of FIG. 10B, the "RLM/Q.931 Signal Path" service tab is selected.

A provisioning job panel 1028 comprises a list of provisioning jobs. A provisioning job will be implicitly created when the user applies a provisioning request. The provisioning job panel 1028 displays, for each job, an identifier, status value (pending, completed or error), submission time, and completion time. The user can cancel pending jobs, or delete completed jobs using function buttons 1034. The user can select any job, and review its job content and provisioning results. For failed jobs, the user can view detailed failure report, which includes failure reason, and rollback status if any; the user can also edit a failed job, and re-submit the job for processing.

A message status panel 1030 provides for display of messages or status indicators.

In one embodiment, provisioning functions can be performed on an individual network device, or on a group of devices contained in a virtual entity (such as SC/GW in a virtual gateway; or GW/GK/DGKs in a virtual zone or region). The Provisioning GUI enforces dependencies of such objects when configuring the features on the selected network entities. Table 1 below indicates what operations may be performed with respect to particular virtual entities:

TABLE 1

Dependency Chart for Functions and Virtual Entities

| | | | Object Type | | |
|---|---|---|---|---|---|
| Provisioning Feature | Region (GW, GK & DGK) | Virtual Zone (GW, GK & DGK) | Virtual Gateway | | |
| | | | SC | GW | GK/DGK |
| RLM/Q.931 | | | x | x | |
| Voice Port/ Nailed Trunk | | | x | x | |
| SNMP | x | x | | x | x |
| NTP | x | x | | x | x |
| RADIUS | x | x | | x | x |
| OSP | | x | | x | |
| H.235 Security | | x | | | |
| IVR & VoiceXML | | | | x | |
| DNIS Map | | | | x | |
| Access List | | | | x | x |
| Interface | | | | x | x |
| HSRP | | | | | x |

In an embodiment, the Provisioning GUI supports job scheduling; upon applying a configuration operation, the user is given the choice to run the job immediately, or schedule it to run at a specific future time. In another embodiment, a user may launch the Provisioning GUI from a web browser running on a client machine.

Hardware Overview

Figure 7:
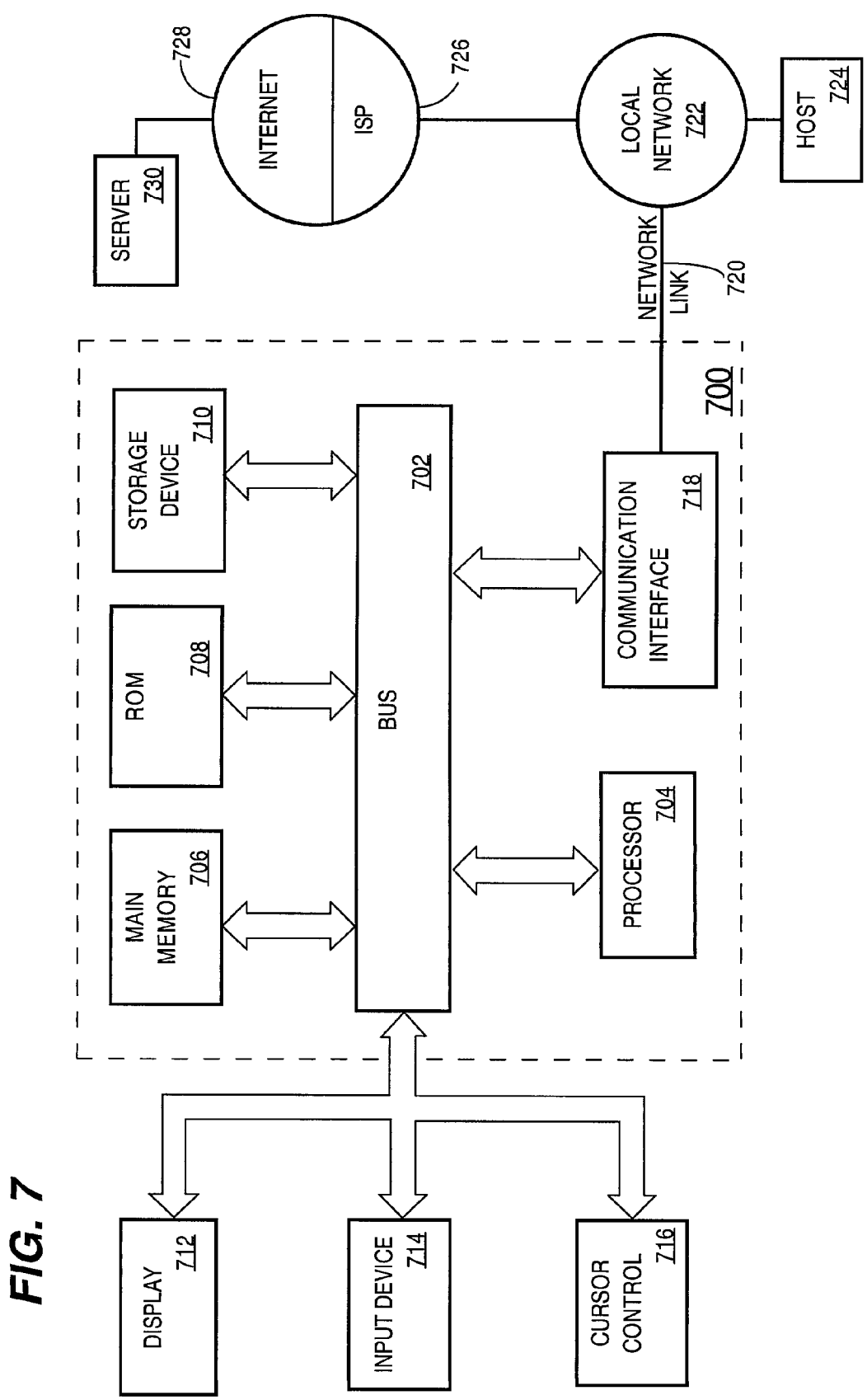
FIG. 7 is a computer system on which an embodiment of the invention may be implemented.

FIG. 7 is a block diagram that illustrates a computer system 700 upon which an embodiment of the invention may be implemented.

Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

BENEFITS, EXTENSIONS AND ALTERNATIVES

Modeling and driving configuration management applications for an OPT network as if that OPT network consisted of a set of virtual switches offers significant benefits. These benefits include:

(1) Simplifying the way OPT networks can be managed by allowing operators to think in terms of concepts that the operators already know and can easily relate to, and by abstracting management information and operations from multiple places in the network, which leads to more efficient overall network operations.

(2) Allowing easy flagging, or avoiding altogether, of inconsistencies and error conditions in an OPT network configurations results in managing network operations in a less error prone way; therefore decreasing service outages.

(3) Enabling management applications to be built in such a way that OPT management does not result in significant additional operational complexity as compared with TDM management. As a result and contrary to conventional thinking, operational complexity is reduced by using a virtual switch as management of voice and data are combined.

Added benefits of automating management tasks through virtual switch operations include a decrease in errors, and encapsulation of real devices and actions by manipulating real devices and actions through objects that represent these real devices and actions.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing a packet voice network that uses ITU Recommendation H.323 and using a virtual entity approach, the method comprising the computer-implemented steps of:

creating and storing a virtual zone object, wherein the virtual zone object represents a virtual zone comprising one or more virtual gateways and one or more associated gatekeepers that are respectively associated with the one or more virtual gateways;

receiving user input that specifies a single configuration operation on the virtual zone and one or more parameter values, wherein the user input does not specify both a virtual gateway and its associated gatekeeper; and in response to receiving the user input, automatically issuing one or more configuration instructions to both a virtual gateway of the one or more virtual gateways and its associated gatekeeper, resulting in configuring both the virtual gateway and the associated gatekeeper as specified in the user input;

wherein the configuration operation comprises a gatekeeper configuration function that is one of: Configure Hot Standby Router Protocol (HSRP); Configure Simple Network Management Protocol (SNMP); Configure Network Time Protocol (NTP); Configure Remote Authentication Dial In User Service (RADIUS) related parameters; Configure Access List; or Configure Ethernet Interface.

2. A method as recited in claim 1, wherein the virtual zone object is created as part of a network management application computer program, wherein the network management application is communicatively coupled to an operational support system and to one or more element management systems, and further comprising the steps of issuing one or more configuration requests to one or more of the element management systems as part of the step of automatically issuing configuration instructions.

3. A method as recited in claim 1, wherein the virtual zone object is created as part of a network management application computer program that generates a graphical user interface that displays an icon representation of the virtual zone, and wherein the step of receiving user input comprises the step of receiving user input dragging the icon representation and dropping the icon representation in a data entry field.

4. A method as recited in claim 3, further comprising the step of displaying the icon representation in an object holding area of the graphical user interface when the virtual gateway associated with the object is not then currently associated with a H.323 gatekeeper.

5. A method as recited in claim 3, wherein the graphical user interface comprises a tree view of the virtual zone and each virtual gateway or H.323 gatekeeper associated therewith, a topology map of a network topology that includes the virtual zone, and an object holding area that displays un-associated network elements.

6. A method as recited in claim 1, wherein the configuration operation of the step of receiving user input comprises one of topology functions, provisioning functions, security management functions, or northbound Application Programming Interface (API) functions.

7. A method as recited in claim 1, wherein the configuration operation of the step of receiving user input comprises a topology function that is one of discovery of network element physical and logical configurations; discovery of network layer concepts; periodic and on-demand synchronization with network elements; flagging of network mis-configuration and policy violations; integrated network topology views; launching another management application; or synchronizing topological changes between applications.

8. A method as recited in claim 1, wherein the configuration operation of the step of receiving user input comprises a provisioning function that is one of region configuration, virtual zone configuration, virtual gateway configuration, or configuration of gatekeepers and directory gatekeepers.

9. A method as recited in claim 1, wherein the configuration operation of the step of receiving user input comprises a provisioning function that is one of deploy Simple Network Management Protocol (SNMP); Deploy Network Time Protocol (NTP); Configure Remote Authentication Dial In User Service (RADIUS) related parameters; Configure Accounting Template; Configure Authentication Authorization Accounting (AAA) Voice Class; Configure Gateway Accounting; Virtual Zone Configuration; Configure H.235 Security options; Configure SNMP; Configure NTP; or Configure OSP related parameters.

10. A method as recited in claim 1, wherein the configuration operation of the step of receiving user input comprises a virtual gateway configuration function that is one of Configure Q.931/Redundant Link Manager (RLM) Signal Path, including Generic Transparency Descriptor (GTD) parameters; Configure Voice Port, including Digital Voice Port for Signaling System 7 (SS7), Integrated Services Digital Network-Primary Rate Interface (ISDN-PRI), T1 Channel-Associated Signaling (CAS), E1 R2 signaling, and Analog Voice Port for E&M, Foreign eXchange Station (FXS), Foreign eXchange Office (FXO) signaling; Configure Interactive Voice Response (IVR) & VoiceXML; Configure Dialed Number Identification Service (DNIS) Map; Configure Simple Network Management Protocol (SNMP); Configure Network Time Protocol (NTP); Configure Remote Authentication Dial In User Service (RADIUS) related parameters; Configure Accounting Template; Configure Authentication Authorization Accounting (AAA) Voice Class; Configure Gateway Accounting; Configure Open Settlements Protocol (OSP) related parameters; Configure Access List; Configure Ethernet Interface; Configure T.37/T.38 FAX Application; Configure H.323 parameters; Configure Bandwidth Request (BRQ) Message Forwarding; Configure ISDN User Part (ISUP) Parameter Forwarding; or Configure Trunk Group.

11. A method as recited in claim 1, wherein the virtual zone object contains a plurality of programmatic objects representing the one or more virtual gateways and one or more virtual H.323 gatekeeper groups.

12. A method as recited in claim 1, wherein the virtual zone object contains a plurality of programmatic objects representing the one or more virtual gateways and one or more virtual H.323 gatekeeper groups, wherein the one or more virtual gateways each comprise programmatic objects representing a gateway and a media gateway controller complex.

13. A method as recited in claim 1, wherein the virtual zone object is contained within a region object that also includes programmatic objects representing an Open Settlement Protocol (OSP) server and a one or more virtual H.323 directory gatekeeper groups.

14. A method as recited in claim 1,
wherein the user input comprises user input selecting a virtual zone having a virtual Signaling System 7 (SS7) gateway therein, and user input selecting an "Add Voice Port" function to add a voice port; and
wherein the configuration instructions instruct an H.323 gateway associated with the virtual SS7 gateway, and H.323 gatekeeper, as specified, to:
configure a Time-Division Multiplexing (TDM) controller, if it is not already configured;
for a T3 controller, configure cable length, framing type, and description parameter, and create a plurality of logical T1 controllers;
for a T1/E1 controller, configure framing, clock source, and line coding parameters;
for NFAS, create a Primary Rate Interface-Group (PRI-Group);
configure the parameters of voice port that are independent of the type of signaling;
inform the SS7 gateway to retrieve a configuration file containing the foregoing configuration instructions and perform a syntax check, without writing the configuration into the Gateway's startup or running configuration, for all the commands in the configuration file;
add a nailed trunk to a signaling controller that is associated with the virtual zone;
inform the gateway to get the configuration file and execute all the commands in the configuration file, and persistently store the configuration into the startup configuration of the gateway.

15. A method as recited in claim 1, wherein the virtual zone object comprises one or more virtual gatekeeper objects, wherein each virtual gatekeeper object represents a gatekeeper and a route server.

16. A method as recited in claim 1, wherein the virtual zone object comprises one or more virtual gatekeeper objects, wherein each virtual gatekeeper object represents a gatekeeper and a route server, and wherein each virtual gatekeeper object is configured to respond to requests to perform route selection by requesting the gatekeeper to resolve a route in cooperation with the route server.

17. A method as recited in claim 1, wherein the virtual zone object comprises one or more virtual gatekeeper objects, wherein each virtual gatekeeper object represents a gatekeeper and a route server, and further comprising the steps of:
sending a request to perform route selection to the gateway within the virtual zone object;
requesting an H.323 gatekeeper to perform route selection;
requesting a dedicated route server to perform route selection;

receiving a route selection decision from the route server; and communicating the route selection decision from the H.323 gatekeeper to the gateway.

18. A computer-readable medium carrying one or more sequences of instructions, wherein the computer-readable medium is one of non-volatile or volatile media, for managing a packet voice networks that uses ITU Recommendation H.323 and using a virtual zone approach, which instructions, when executed by one or more processors, cause the one or more processors to carry out the steps of:

creating and storing a virtual zone object, wherein the virtual zone object represents a virtual zone comprising one or more virtual gateways and one or more H.323 gatekeepers that are respectively associated with the one or more virtual gateways;

receiving user input that specifies a single configuration operation on the virtual zone and one or more parameter values, wherein the user input does not specify both a virtual gateway and its associated gatekeeper; and in response to receiving the user input, automatically issuing one or more configuration instructions to both a virtual gateway of the one or more virtual gateways and its associated H.323 gatekeeper, resulting in configuring both the virtual gateway and the H.323 gatekeeper as specified in the user input;

wherein the configuration operation comprises a gatekeeper configuration function that is one of: Configure Hot Standby Router Protocol (HSRP); Configure Simple Network Management Protocol (SNMP); Configure Network Time Protocol (NTP); Configure Remote Authentication Dial In User Service (RADIUS) related parameters; Configure Access List; or Configure Ethernet Interface.

19. An apparatus for managing a packet voice network that uses ITU Recommendation H.323 and using a virtual zone approach, comprising:

means for creating and storing a virtual zone object, wherein the virtual zone object represents a virtual zone comprising one or more virtual gateways and one or more H.323 gatekeepers that are respectively associated with the one or more virtual gateways;

means for receiving user input that specifies a single configuration operation on the virtual zone and one or more parameter values, wherein the user input does not specify both a virtual gateway and its associated gatekeeper; and means for automatically issuing, in response to receiving the user input, one or more configuration instructions to both a virtual gateway of the one or more virtual gateways and its associated H.323 gatekeeper, resulting in configuring both the virtual gateway and the H.323 gatekeeper as specified in the user input;

wherein the configuration operation comprises a gatekeeper configuration function that is one of: Configure Hot Standby Router Protocol (HSRP); Configure Simple Network Management Protocol (SNMP); Configure Network Time Protocol (NTP); Configure Remote Authentication Dial In User Service (RADIUS) related parameters; Configure Access List; or Configure Ethernet Interface.

20. An apparatus as recited in claim 19, wherein:

the virtual zone object is created as part of a network management application computer program;

the network management application is communicatively coupled to an operational support system and to one or more element management systems; and the apparatus further comprising means for issuing one or more configuration requests to one or more of the element management systems as part of the step of automatically issuing configuration instructions.

21. An apparatus as recited in claim 19, wherein the configuration operation comprises a provisioning function that is one of region configuration, virtual zone configuration, virtual gateway configuration, or configuration of gatekeepers and directory gatekeepers.

22. An apparatus as recited in claim 19, wherein the virtual zone object contains a plurality of programmatic objects representing the one or more virtual gateways and one or more virtual H.323 gatekeeper groups, wherein the one or more virtual gateways each comprise programmatic objects representing a gateway and a media gateway controller complex.

23. An apparatus as recited in claim 19, wherein the virtual zone object is contained within a region object that also includes programmatic objects representing an Open Settlement Protocol (OSP) server and a one or more virtual H.323 directory gatekeeper groups.

24. An apparatus as recited in claim 19, wherein the virtual zone object comprises one or more virtual gatekeeper objects, wherein each virtual gatekeeper object represents a gatekeeper and a route server, and wherein each virtual gatekeeper object is configured to respond to requests to perform route selection by requesting the gatekeeper to resolve a route in cooperation with the route server.

25. An apparatus for managing a packet voice network that uses ITU Recommendation H.323 and using a virtual zone approach, comprising:

a network interface that is coupled to the data network for receiving one or more packet flows therefrom;

a processor;

one or more stored sequences of instructions which, when executed by the processor, cause the processor to carry out the steps of:

creating and storing a virtual zone object, wherein the virtual zone object represents a virtual zone comprising one or more virtual gateways and one or more H.323 gatekeepers that are respectively associated with the one or more virtual gateways;

receiving user input that specifies a single configuration operation on the virtual zone and one or more parameter values, wherein the user input does not specify both a virtual gateway and its associated gatekeeper; and in response to receiving the user input, automatically issuing one or more configuration instructions to both a virtual gateway of the one or more virtual gateways and its associated H.323 gatekeeper, resulting in configuring both the virtual gateway and the H.323 gatekeeper as specified in the user input;

wherein the configuration operation comprises a gatekeeper configuration function that is one of: Configure Hot Standby Router Protocol (HSRP); Configure Simple Network Management Protocol (SNMP); Configure Network Time Protocol (NTP); Configure Remote Authentication Dial In User Service (RADIUS) related parameters; Configure Access List; or Configure Ethernet Interface.

26. An apparatus as recited in claim 25, wherein:

the virtual zone object is created as part of a network management application computer program;

the network management application is communicatively coupled to an operational support system and to one or more element management systems; and the one or more stored sequences of instructions include instructions which, when executed by the processor, cause the processor to carry out the step of issuing one or more configuration requests to one or more of the element management systems as part of the step of automatically issuing one or more configuration instructions.

27. An apparatus as recited in claim 25, wherein the configuration operation comprises a provisioning function that is one of region configuration, virtual zone configuration, virtual gateway configuration, or configuration of gatekeepers and directory gatekeepers.

28. An apparatus as recited in claim 25, wherein the virtual zone object contains a plurality of programmatic objects representing the one or more virtual gateways and one or more virtual H.323 gatekeeper groups, wherein the one or more virtual gateways each comprise programmatic objects representing a gateway and a media gateway controller complex.

29. An apparatus as recited in claim 25, wherein the virtual zone object is contained within a region object that also includes programmatic objects representing an Open Settlement Protocol (OSP) server and a one or more virtual H.323 directory gatekeeper groups.

30. An apparatus as recited in claim 25, wherein the virtual zone object comprises one or more virtual gatekeeper objects, wherein each virtual gatekeeper object represents a gatekeeper and a route server, and wherein each virtual gatekeeper object is configured to respond to requests to perform route selection by requesting the gatekeeper to resolve a route in cooperation with the route server.

\* \* \* \* \*